(12) United States Patent
Kawabata et al.

(10) Patent No.: US 10,989,694 B2
(45) Date of Patent: Apr. 27, 2021

(54) RAIL INSPECTION SYSTEM

(71) Applicant: HITACHI HIGH-TECH FINE SYSTEMS CORPORATION, Saitama (JP)

(72) Inventors: Ryuzo Kawabata, Tokyo (JP); Hiroshi Suzuki, Saitama (JP); Kenji Yamamoto, Saitama (JP); Akihiko Kandori, Tokyo (JP)

(73) Assignee: Hitachi High-Tech Fine Systems Corporation, Saitama (JP)

( * ) Notice: Subject to any disclaimer, the term of this patent is extended or adjusted under 35 U.S.C. 154(b) by 51 days.

(21) Appl. No.: 16/468,632

(22) PCT Filed: Sep. 11, 2017

(86) PCT No.: PCT/JP2017/032723
§ 371 (c)(1),
(2) Date: Jun. 11, 2019

(87) PCT Pub. No.: WO2018/116546
PCT Pub. Date: Jun. 28, 2018

(65) Prior Publication Data
US 2019/0302057 A1    Oct. 3, 2019

(30) Foreign Application Priority Data
Dec. 21, 2016   (JP) .............................. JP2016-248281

(51) Int. Cl.
*G01N 27/82*     (2006.01)
*G01N 27/83*     (2006.01)
(Continued)

(52) U.S. Cl.
CPC ............... *G01N 27/83* (2013.01); *B61K 9/10* (2013.01); *B61L 23/044* (2013.01); *G01N 27/82* (2013.01); *G01N 2291/2623* (2013.01)

(58) Field of Classification Search
CPC ........ G01N 27/83; G01N 27/82; G01N 27/87; G01N 2291/2633; B61K 9/10; B61L 23/044
See application file for complete search history.

(56) References Cited

U.S. PATENT DOCUMENTS 6,031,790 A  *  2/2000  Futsuhara ............. B61L 23/044
                                                    367/96
6,600,999 B2 *  7/2003  Clark ..................... B61D 15/00
                                                    702/185
(Continued)

FOREIGN PATENT DOCUMENTS

EP     3 477 294 A1    5/2019
JP     59-7940 B2      2/1984
(Continued)

OTHER PUBLICATIONS

Extended European Search Report issued in European Application No. 17885193.7 dated Jul. 10, 2020 (eight pages).
(Continued)

*Primary Examiner* — Dominic E Hawkins
(74) *Attorney, Agent, or Firm* — Crowell & Moring LLP

(57) ABSTRACT

Provided is a rail inspection system capable of accurately detecting a defect of a railroad rail. The system includes: a sensor part group that has a plurality of sensor parts having receiver coils, and first oscillator coils and second oscillator coils corresponding to the receiver coils being arranged in a line parallel in a width direction of a railroad rail to be inspected; an oscillation part that supplies an oscillation signal to each of the first oscillator coils and the second oscillator coils; and a detection part group that has a plurality of detection parts to detect, with respect to an output signal (Continued)

from each of the receiver coils when the sensor part group moves in a laying direction of the railroad rail, a first inspection signal corresponding to a first phase of the output signal and a second inspection signal corresponding to a second phase of the output signal.

7 Claims, 14 Drawing Sheets

(51) Int. Cl.
*B61K 9/10* (2006.01)
*B61L 23/04* (2006.01)

(56) References Cited

U.S. PATENT DOCUMENTS

| | | | |
|---|---|---|---|
| 2002/0033049 A1* | 3/2002 | Amini | B61K 9/10 73/636 |
| 2005/0072236 A1* | 4/2005 | Heyman | G01N 29/07 73/602 |
| 2005/0285588 A1 | 12/2005 | Katragadda et al. | |
| 2007/0229066 A1 | 10/2007 | Narishige et al. | |
| 2013/0024135 A1 | 1/2013 | Blum | |
| 2013/0113472 A1 | 5/2013 | Blair et al. | |
| 2015/0183448 A1* | 7/2015 | Cooper | B61L 23/044 246/34 R |
| 2018/0172639 A1 | 6/2018 | Kawabata et al. | |

FOREIGN PATENT DOCUMENTS

| | | |
|---|---|---|
| JP | 8-261991 A | 10/1996 |
| JP | 2003-50234 A | 2/2003 |
| JP | 2006-226884 A | 8/2006 |
| JP | 2011-196863 A | 10/2011 |
| JP | 2014-66688 A | 4/2014 |
| JP | 2014-102197 A | 6/2014 |
| JP | 2014-157078 A | 8/2014 |
| JP | 2017-88411 A | 5/2017 |
| WO | WO 2017/006589 A1 | 1/2017 |

OTHER PUBLICATIONS

International Search Report (PCT/ISA/210) issued in PCT Application No. PCT/JP2017/032723 dated Nov. 28, 2017 with English translation (four (4) pages).

Japanese-language Written Opinion (PCT/ISA/237) issued in PCT Application No. PCT/JP2017/032723 dated Nov. 28, 2017 (six (6) pages).

* cited by examiner

RAIL INSPECTION SYSTEM

TECHNICAL FIELD

The present invention relates to a rail inspection system.

BACKGROUND OF THE INVENTION

As a background art in this technical field, there is disclosed in Patent Document 1. A defect such as a crack may occur in a rail used for a railroad or the like. When such a kind of defect is left, a problem such as a breakage of the rail occurs. Thus, preferably, a nondestructive inspection is performed regularly on the rail. For example, the abstract of the following PTL 1 describes that "according to one embodiment, the present technique provides a testing apparatus for testing material integrity in an object. The testing apparatus includes an electrical conductor and a sensing device. In the exemplary testing device, the electrical conductor extends in a generally linear direction and is configured to route current in a direction generally transverse to a longitudinal axis of the object being tested. Routing of current through the electrical conductor creates remote field eddy current effect, which, in turn, affects a magnetic field around the test object. The testing apparatus also includes a sensing device located at a distance from the electrical conductor and configured to detect magnetic fields generated in response to current routed through the electrical conductor."

PRIOR ART DOCUMENTS

Patent Documents

Patent Document 1: U.S. Patent Application Publication No. 2005/0285588 (Description)

SUMMARY OF THE INVENTION

Problems to be Solved

In the technique of Patent Document 1, the magnetic field generated by the eddy current is detected. However, the magnitude of the eddy current is inversely proportional to the square of the distance between testing apparatus and the test object (railroad rail). Thus, an error generated by a vibration of a measuring vehicle (a railroad vehicle for inspecting a state of a track or an overhead line) becomes large, and it is difficult to accurately detect the defect of the railroad rail.

The invention has been made in consideration of the above situation, and an object thereof is to provide a rail inspection system which can accurately detect a defect of a railroad rail.

Solution to Problems

In order to solve the above problem, a rail inspection system of the invention includes: an oscillation part which outputs an oscillation signal of a predetermined frequency; a plurality of sensor parts which face a railroad rail of an inspection target and are arranged in a direction of crossing a laying direction of the railroad rail and which each includes a receiver coil and a first oscillator coil and a second oscillator coil which generate AC magnetic fields in directions opposite to each other with respect to a place where the receiver coil is provided when the oscillation signal is supplied; and a plurality of detection parts which detect a first inspection signal corresponding to a first phase of an output signal and a second inspection signal corresponding to a second phase of the output signal with respect to the output signal output from each of the plurality of receiver coils when the plurality of sensor parts move in the laying direction of the railroad rail.

Advantageous Effects of The Invention

According to the invention, the defect of the railroad rail can be detected accurately.

DESCRIPTION OF EMBODIMENTS

First Embodiment

Configuration of First Embodiment

Figure 1:
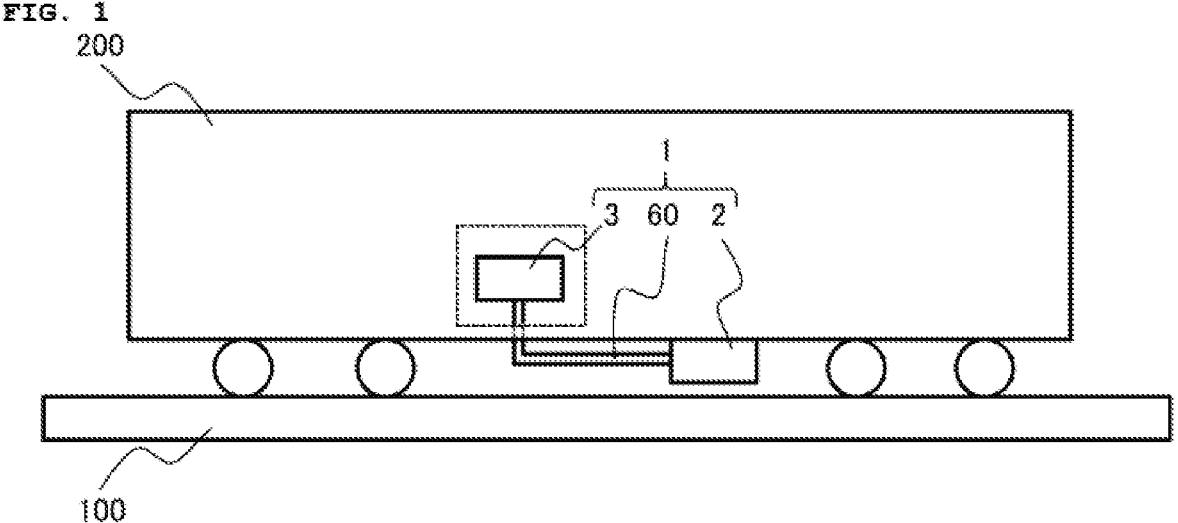
FIG. 1 is a schematic view of a rail inspection system according to a first embodiment of the invention.

FIG. 1 is a schematic view of a rail inspection system 1 according to a first embodiment of the invention.

In FIG. 1, the rail inspection system 1 has a detector 2, a processor 3, and a cable 60 connecting both. For example, the rail inspection system 1 is mounted on a self-propelled measuring vehicle 200. The detector 2 is installed in a position of facing the railroad rail 100 as an inspection target object, and the processor 3 is installed in a chamber of the measuring vehicle 200.

Figure 2:
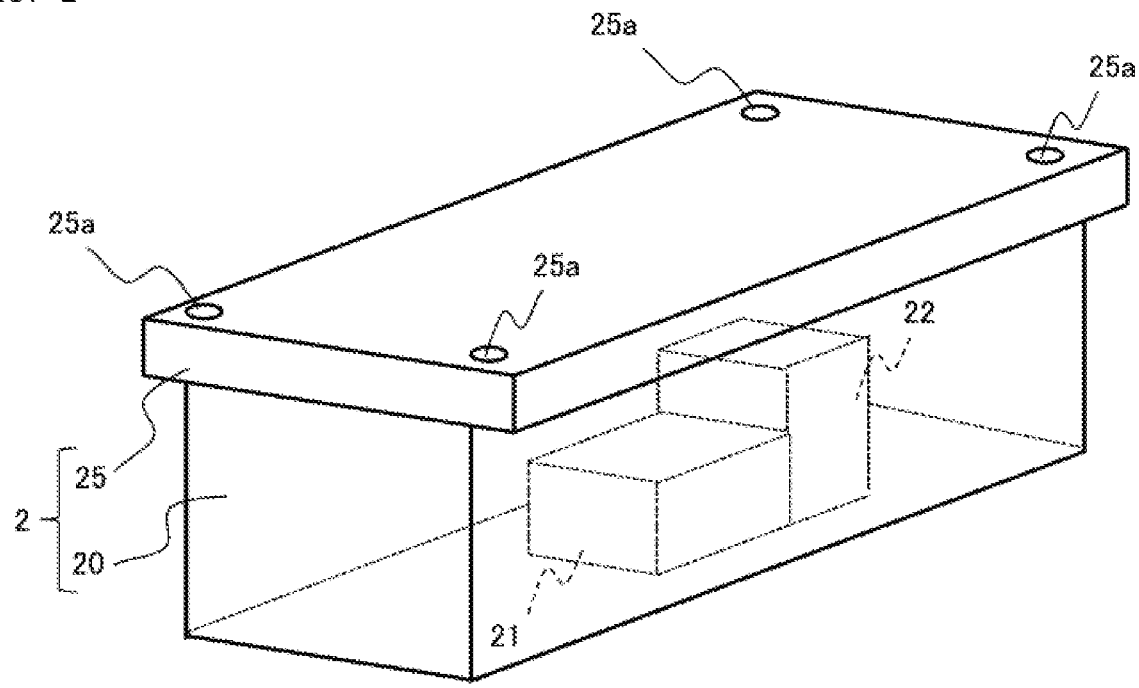
FIG. 2 is a perspective view of a detector according to the first embodiment.

FIG. 2 is a perspective view of the detector 2.

In FIG. 2, the detector 2 has a casing 20 which is formed in a hollow rectangular parallelepiped shape and a flange 25 which is fixed on the upper surface of the casing 20 and has a rectangular plate shape. Through holes 25a are formed at four corners of the flange 25. In addition, a screw hole (not illustrated) is provided at the position of facing the through hole 25a in a place where the detector 2 is arranged in the measuring vehicle 200. A bolt is inserted into the through hole 25a, and the bolt is fastened to the screw hole, whereby the detector 2 is fixed in a predetermined position of the measuring vehicle 200. When the detector 2 is fixed at the predetermined position, the center of the railroad rail 100 coincides with the center of the detector 2. For this reason, the flange 25 serves as a tool for installing the detector 2 at the predetermined position in the railroad rail 100. A sensor part group 21 and an amplification filter part group 22 are fixed on the bottom surface of the casing 20.

Figure 3:
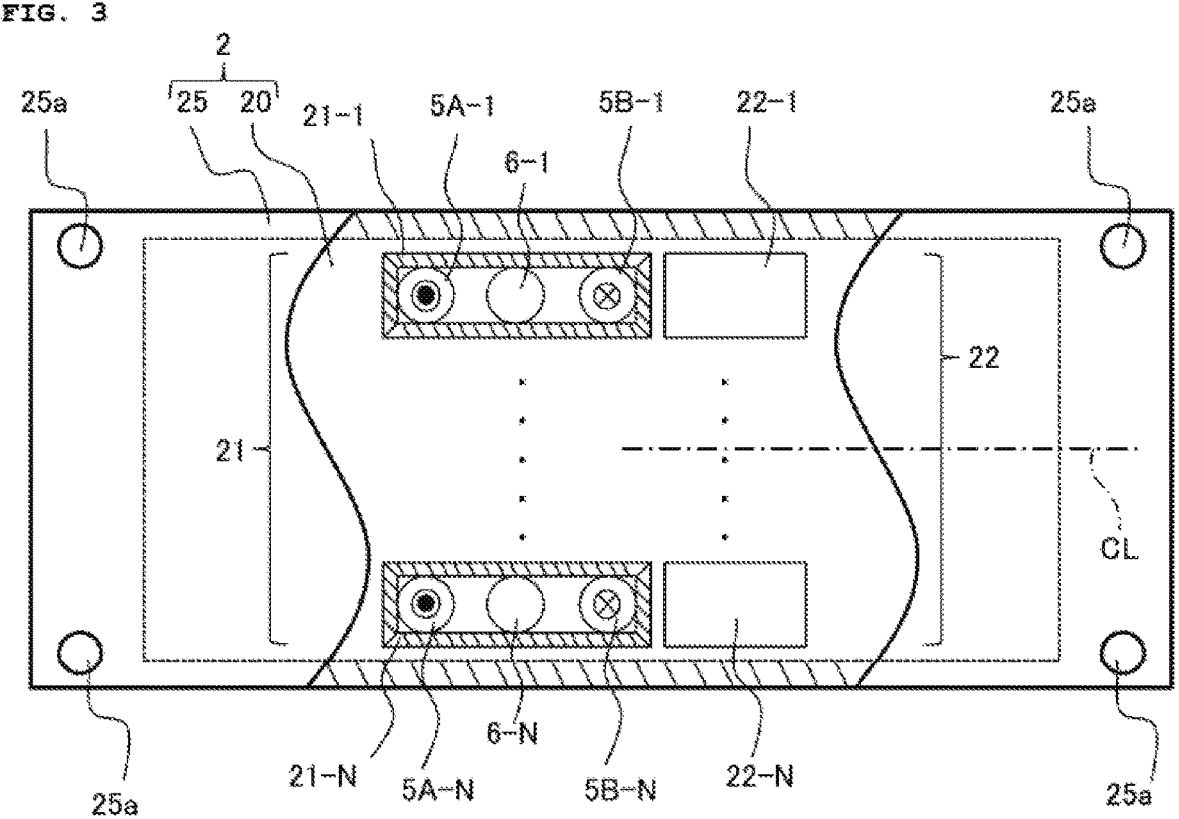
FIG. 3 is a partially cut-away plan view of the detector according to the first embodiment.

FIG. 3 is a partially cut-away plan view of the detector 2.

In FIG. 3, the sensor part group 21 has a plurality of N (N is plural) sensor parts 21-1 to 21-N which are arranged in a line parallel in a width direction of the railroad rail 100. In addition, the amplification filter part group 22 has the same number of amplification filter parts 22-1 to 22-N. The sensor parts 21-1 to 21-N have oscillator coils 5A-1 to 5A-N (first oscillator coil), the oscillator coils 5B-1 to 5B-N (second oscillator coil), and receiver coils 6-1 to 6-N, respectively. These coils are configured by winding a coated copper wire.

The oscillator coil 5A-k (where 1≤k≤N), the receiver coil 6-k, and the oscillator coil 5B-k are arranged along in a laying direction of the railroad rail 100 (see FIG. 1). The receiver coil 6-k is arranged to have equal intervals between the oscillator coil 5A-k and the oscillator coil 5B-k. In the oscillator coils 5A-k and 5B-k, an alternating current of a predetermined oscillation frequency f (predetermined frequency) is supplied from the processor 3 (see FIG. 1) through the cable 60. Accordingly, an AC magnetic field is generated from each of the oscillator coils 5A-k and 5B-k. In the receiver coil 6, an induced voltage is generated by interlinked magnetic flux.

The amplification filter parts 22-k performs an amplifying and filtering processing on the induced voltage generated in the receiver coil 6-k and transmits the result thereof to the processor 3 through the cable 60 (see FIG. 1). The processor 3 performs an analysis processing on the received signal and detects the defect of the railroad rail 100.

In order to generate the above-described AC magnetic field in the detector 2, the casing 20 is preferably made non-magnetic, and a material such as a glass epoxy excellent in an impact resistance and an environmental resistance is preferably used in consideration of outdoor use. In order to prevent the position of each sensor part from being changed by the vibration or the impact, the internal space of the casing 20 is preferably formed to have a resin mold structure. In addition, a center line CL of the N sensor parts 21-1 to 21-N preferably corresponds to the center of the detector 2.

Principle of Defect Detection

Figure 4A:
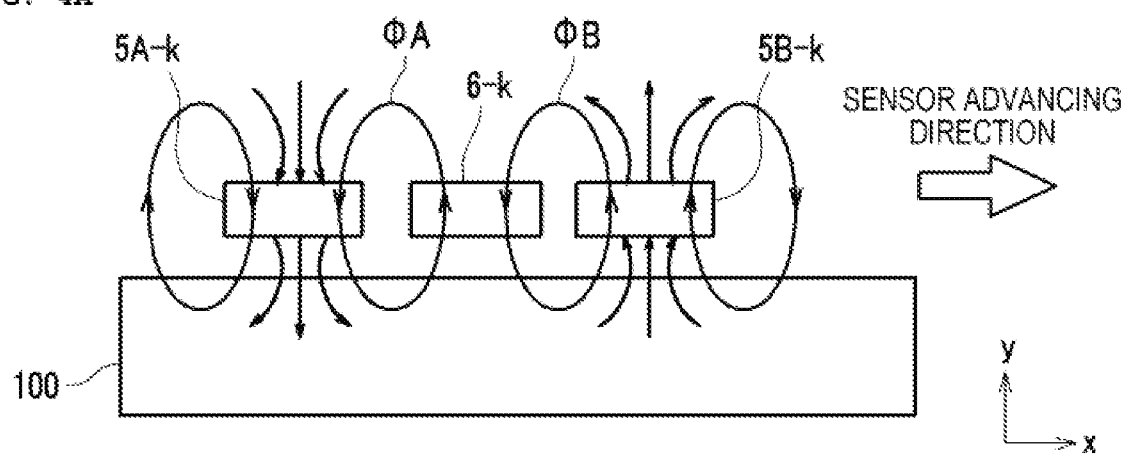
FIG. 4A is an explanation diagram of a principle in a case where a railroad rail in the first embodiment has no defect.
Figure 4B:
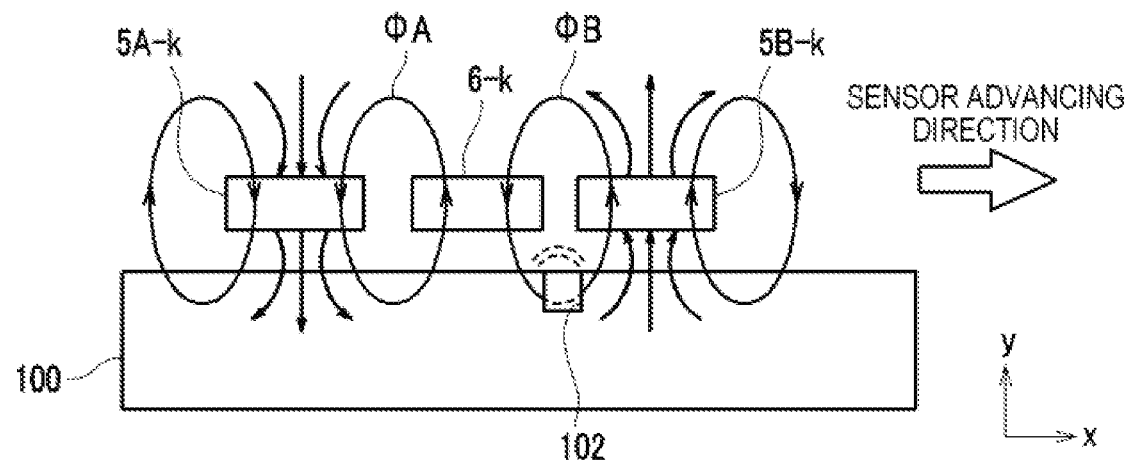
FIG. 4B is an explanation diagram of a principle in a case where the railroad rail in the first embodiment has a defect.

FIGS. 4A and 4B are explanation diagrams of a principle of defect detection according to the present embodiment.

In the oscillator coils 5A-k and 5B-k, the winding starts or the winding ends of the coated copper wires are connected in series (or in parallel) to each other. When the current is supplied from the processor 3, the AC magnetic field of which the phase is inverted is generated. More specifically, the oscillator coils 5A-k and 5B-k may be connected in series (or in parallel), and an AC voltage may be applied to the series circuit (or parallel circuit). Magnetic fluxes φA and φB generated by the oscillator coils 5A-k and 5B-k are propagated to the tread of the railroad rail 100 through air, so as to generate the flow of the magnetic flux in the railroad rail 100.

FIG. 4A illustrates an example in a case where the vicinity of the receiver coil 6-k has no defect particularly such as a crack in the railroad rail 100.

In the magnetic fluxes φA and φB, the components interlinked in the receiver coil 6-k have the opposite direction of the magnetic flux, so as to cancel each other. Accordingly, the interlinkage magnetic flux of the receiver coil 6-k becomes almost zero, and the induced voltage of the receiver coil 6 also becomes almost zero. Herein, when the measuring vehicle 200 (see FIG. 1) travels, the detector 2 generates the flow of the magnetic flux on the railroad rail 100 while moving. Further, the flow of the magnetic flux is constant in the place where there is no defect. Thus, the induced voltage of the receiver coil 6 becomes almost constant (0).

FIG. 4B illustrates an example in a case where a defective portion 102 which is a crack is formed in the vicinity of the receiver coil 6-k in the railroad rail 100. In the illustrated example, the flow of the magnetic flux is disturbed, and the leakage of the magnetic flux occurs from the tread of the railroad rail 100. For this reason, when the receiver coil 6-k passes near the defective portion 102, the induced voltage of the receiver coil 6-k becomes a relatively large value.

The defect detection according to the present embodiment detects the generated leakage magnetic field on the basis of the fact that the flow of the magnetic flux generated in the railroad rail 100 which is an inspection target object is changed in the defective portion 102. As an analysis model of the leakage magnetic field, the leakage magnetic field generated in a space can be expressed on the basis of a dipole model. In this model, it is assumed that diamagnetic magnetic loads are uniformly distributed to both end portions of the uniformly-magnetized defective portion 102, and the leakage magnetic field can approximate to the spatial magnetic field generated therefrom.

First, in FIG. 4B, it is assumed that the laying direction of the railroad rail 100 is set to an x direction, a depth direction of the defective portion 102 is set to a y direction, a direction perpendicular to the paper surface is set to a z direction (not illustrated), and the defective portion 102 has infinite length in the z direction. Then, spatial magnetic fields Hx and Hy of the x direction and the y direction at a point (x, y, 0) can be expressed by following Expressions (1) and (2).

$$Hx = \frac{m}{2\pi}\left(a\tan\left(\frac{x-a}{y}\right) - a\tan\left(\frac{x+a}{y}\right) - a\tan\left(\frac{x-a}{y+d}\right) - a\tan\left(\frac{x+a}{y+d}\right)\right) \quad \text{Expression (1)}$$

$$Hy = \frac{m}{4\pi}\left(\ln\frac{(x+a)^2 + y^2}{(x-a)^2 + y^2}\right) - \left(\ln\frac{(x+a)^2 + (y+d)^2}{(x-a)^2 + (y+d)^2}\right) \quad \text{Expression (2)}$$

In Expressions (1) and (2), the width of the defective portion 102 is set to 2a, the depth of the defective portion 102 is set to d, and m is set as a magnetic load amount.

The magnetic load amount m is approximated by following Expression (3) by using a classical electromagnetic solution to the internal magnetic field of the spheroid present in the ferromagnetic body receiving uniform magnetization.

$$m = H_0 \frac{\pi n(\mu - 1)}{2a \, \tan(n(n+\mu))} \quad \text{Expression (3)}$$

In Expression (3), H0 indicates a magnetic field strength for excitation, n indicates an aspect ratio (d/a) of a crack, and p indicates a relative permeability. In the present embodiment, the receiver coil 6-k detects the leakage magnetic field from a direction perpendicular to the laying direction of the railroad rail 100 as the inspection target object, and the measurement result corresponds to a spatial magnetic field Hy. When parameters other than x are set on the basis of Expression (2), the spatial magnetic field Hy can be expressed as a function of the depth d of the defective portion 102, and Hy indicates a change in which a maximum or a minimum appears in an x-axis direction with a central position of the defective portion 102 as a zero position.

Circuit Configuration of First Embodiment

Figure 5:
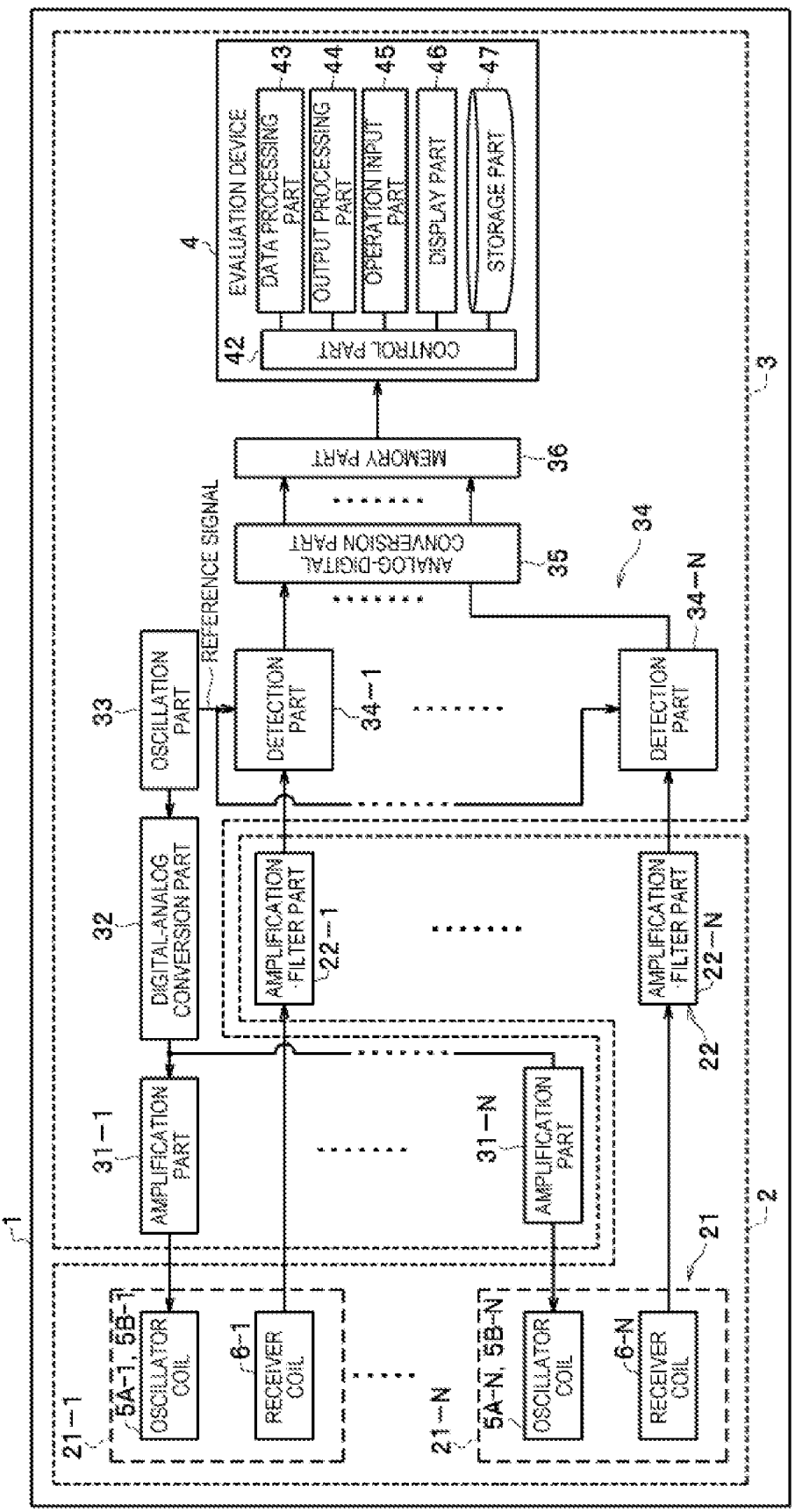
FIG. 5 is a block diagram illustrating the overall configuration of the rail inspection system according to the first embodiment.

FIG. 5 is a block diagram illustrating the overall configuration of the rail inspection system 1 according to the present embodiment.

As described above, the rail inspection system 1 has the detector 2 and the processor 3. Further, the detector 2 has the sensor parts 21-1 to 21-N of the sensor part group 21 and the amplification filter parts 22-1 to 22-N. Each sensor part 21-k (where 1≤k≤N) has the oscillator coils 5A-k and 5B-k and the receiver coil 6-k.

In addition, the processor 3 includes amplification parts 31-1 to 31-N, a digital-analog conversion part 32, an oscillation part 33, detection parts 34-1 to 34-N, an analog-digital conversion part 35, a memory part 36, and an evaluation device 4. Incidentally, the detection parts 34-1 to 34-N are collectively referred to as the detection part group 34.

The oscillation part 33 outputs a sine-wave digital oscillation signal of the predetermined oscillation frequency f (for example, 20 kHz). Incidentally, a frequency other than 20 kHz may be selected as the oscillation frequency f. However, the oscillation frequency f is preferably selected from the frequency in the range of 10 Hz to 100 GHz. This is because when the frequency f is lower than 10 Hz, the sensitivity of the receiver coil 6 is deteriorated, and when the frequency f exceeds 100 GHz, the impedance of the oscillator coils 5A and 5B is increased, thereby weakening the magnetic field. In addition, the frequency f is more preferably selected from the range of 1 kHz to 1 GHz, and still more preferably selected from the range of 10 kHz to 100 kHz.

Incidentally, in the railroad line which is actually operated, a circuit maybe configured to include the railroad rail 100 as a component and be referred to as a "track circuit". This is because a traffic signal or the like is controlled by detecting whether or not the railroad vehicle is present in a specific section of the railroad, so as to prevent a collision accident. When the frequency used in the track circuit is close to the oscillation frequency f, the sensor parts 21-1 to 21-N may malfunction. However, it is proven from experiments that an effect on the sensor parts 21-1 to 21-N made when the frequency used in the track circuit is separated by ±7% or more from the oscillation frequency f can be almost ignored. Accordingly, the oscillation frequency f is preferably selected from the frequency separated by ±0.07 f or more from the frequency used in the track circuit.

In FIG. 5, the digital-analog conversion part 32 converts the digital oscillation signal output by the oscillation part 33 into an analog AC voltage. The amplification part 31 amplifies the AC voltage and applies the voltage to the oscillator coils 5A-k and 5B-k in each sensor part 21-k (where 1≤k≤N). Accordingly, the AC magnetic field of which the phase is inverted is generated from the oscillator coils 5A-k and 5B-k.

In addition, the amplification filter parts 22-k in the detector 2 performs the amplifying and filtering processing on a signal sent from the corresponding receiver coil 6-k and transmits the signal to the detection part 34-k of the processor 3. Incidentally, the "filtering processing" is a low-pass filtering processing of mainly removing frequency components of the oscillation frequency f or more. In addition, the detection part 34-k generates signals X, Y, R, and θ (these signal will be described in detail later) on the basis of the signal supplied from the amplification filter parts 22-k by using a reference signal from the oscillation part 33 and supplies the signals to the analog-digital conversion part 35. The analog-digital conversion part 35 converts each of the analog signals received from the detection parts 34-1 to 34-N into a digital signal. The digital signal output by the analog-digital conversion part 35 is stored as data in the memory part 36 and is supplied to the evaluation device 4.

Next, the evaluation device 4 will be described.

The evaluation device 4 includes the hardware of a general computer such as a CPU (Central Processing Unit), a RAM (Random Access Memory), a ROM (Read Only Memory), and a HDD (Hard Disk Drive). An OS (Operating System), an application program, various kinds of data, and the like are stored in the HDD. The OS and the application program are developed in the RAM and executed by the CPU. In FIG. 5, the inner portion of the evaluation device 4 is illustrated with the function realized by the application program or the like as a block.

The evaluation device 4 includes a control part 42, a data processing part 43, an output processing part 44, an operation input part 45, a display part 46, and a storage part 47.

The evaluation device 4 executes an inspection processing program which specifies the defect of the railroad rail 100 on the basis of the inspection data received the detector 2, the detection parts 34-1 to 34-N, the analog-digital conversion part 35, or the memory part 36. Incidentally, in the present embodiment, the "inspection data" corresponds to data of all steps from the receiver coil 6 of the detector 2 to the evaluation device 4.

The control part 42 reads the inspection data from the memory part 36 and controls an arithmetic processing or like. The data processing part 43 performs an inspection processing on the basis of the inspection data (details are described later). The display part 46 is a LCD (Liquid Crystal Display), a CRT (Cathode Ray Tube) display, or the like which displays the inspection result or the like. The output processing part 44 causes the display part 46 to display the inspection result or the like. At that time, the output processing part 44 performs a processing for displaying the inspection result with a display format which is easy to understand visually by properly using a format of a graph or a table. The operation input part 45 is an information input unit such as a keyboard and a mouse. In the storage part 47, the data processing part 43 stores data such as the processed inspection result. In addition, the data stored in the memory part 36 is also transferred to the storage part 47. Incidentally, the data processing part 43 and the output processing part 44 load the program or the data stored in the storage part 47 in the control part 42 and execute the arithmetic processing to be realized.

Figure 6:
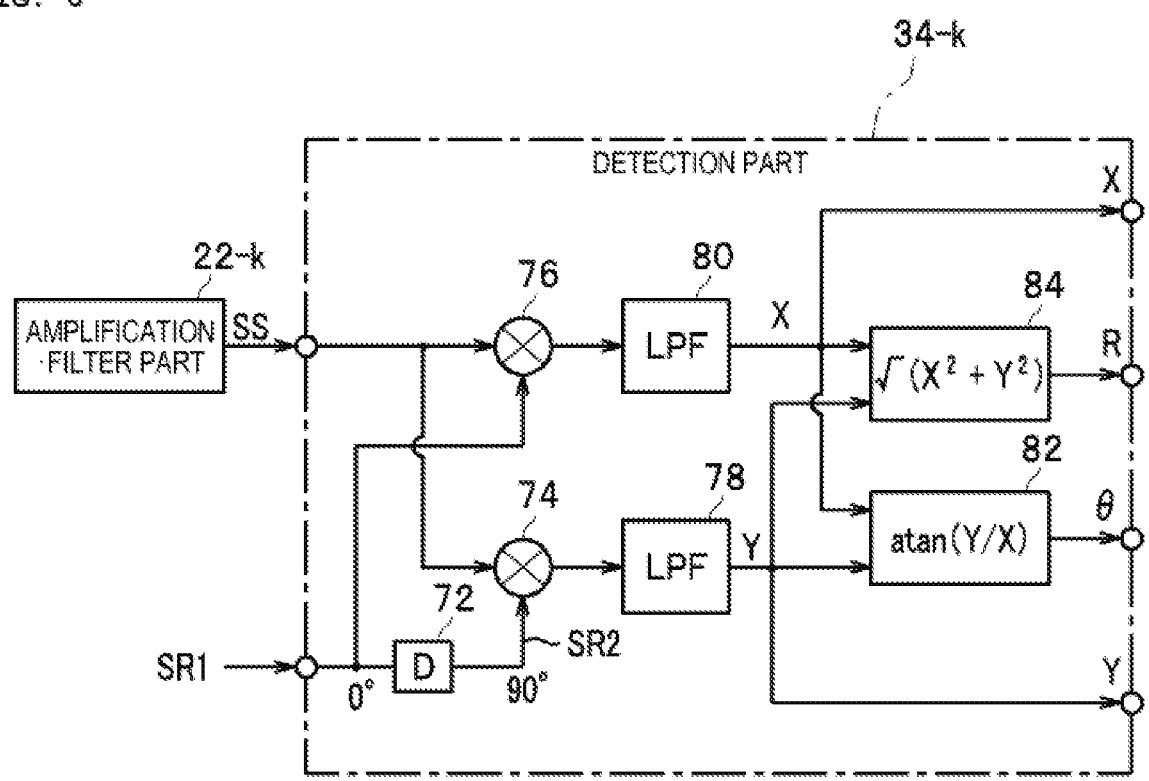
FIG. 6 is a block diagram of a detection part according to the first embodiment.

FIG. 6 is a block diagram of the detection part 34-k (where 1≤k≤N).

A received signal SS from the amplification filter parts 22-k is supplied to phase comparators 74 and 76. In addition, a reference signal SR1 supplied from the oscillation part 33 (see FIG. 5) is delayed by time corresponding to the phase of 90° of the oscillation frequency f by a delay circuit 72. The delayed reference signal SR1 is referred to as a reference signal SR2. The reference signal SR1 is supplied to the phase comparator 76, and the reference signal SR2 is supplied to the phase comparator 74. The phase comparator 76 extracts the components synchronized with the reference signal SR1 in the received signal SS. The extracted signal is filtered by a LPF (low-pass filter) 80, and the LPF 80 outputs the result thereof as a cosine signal X (first inspection signal, displaying target signal).

In addition, the phase comparator 74 extracts the components synchronized with the reference signal SR2 in the received signal SS. The extracted signal is filtered by a LPF 78, and the LPF 78 outputs the result thereof as a sine signal Y (second inspection signal, displaying target signal). An arithmetic unit 84 calculates $\sqrt{(X^2+Y^2)}$ and outputs the result thereof as an amplitude signal R (displaying target signal). In addition, the arithmetic unit 82 calculates an arctangent of (Y/X), that is, atan (Y/X) and outputs the result thereof as a phase difference signal θ (displaying target signal).

The detection part 34-k supplies the above-described signals X, Y, R, and θ to the memory part 36 through the analog-digital conversion part 35 (see FIG. 5). Incidentally, in the illustrated example, the detection part 34-k outputs all the signals X, Y, R, and θ. However, the amplitude signal R and the phase difference signal θ may be calculated on the basis of the cosine signal X and the sine signal Y by the data processing part 43 (see FIG. 5) as well as calculated by the detection part 34-k.

Herein, the description is given about the reason why the detection part 34-k detects the sine signal Y in addition to the cosine signal X. First, if the cosine signal X is emphasized, it is considered that the phase of the reference signal is set such that the amplitude of the cosine signal X is maximized. Then, the set phase is an optimum phase for detecting the cosine signal X. However, the received signal SS is independent for each of the sensor parts 21-1 to 21-N, and the influence of the arrangement place or the manufacturing error is different for each of the sensor parts 21-1 to 21-N. In addition, the optimum phase is varied also by a secular change or a temperature change. Accordingly, it is complicated to set the optimum phase of the reference signal with respect to each of the detection parts 34-1 to 34-N.

The sine signal Y is a signal component which is shifted by a phase of 90° with respect to the excitation magnetic field which excites the rail. As in the present embodiment, when the sine signal Y is detected together with the cosine signal X, the amplitude signal R can be calculated in the arithmetic unit 84 (or the evaluation device 4). Even in a case where the phase difference signal θ is varied, the value of the amplitude signal R becomes constant in principle. Thus, it is possible to omit the processing for optimizing the phase of the reference signal.

Operation of First Embodiment

Figure 7:
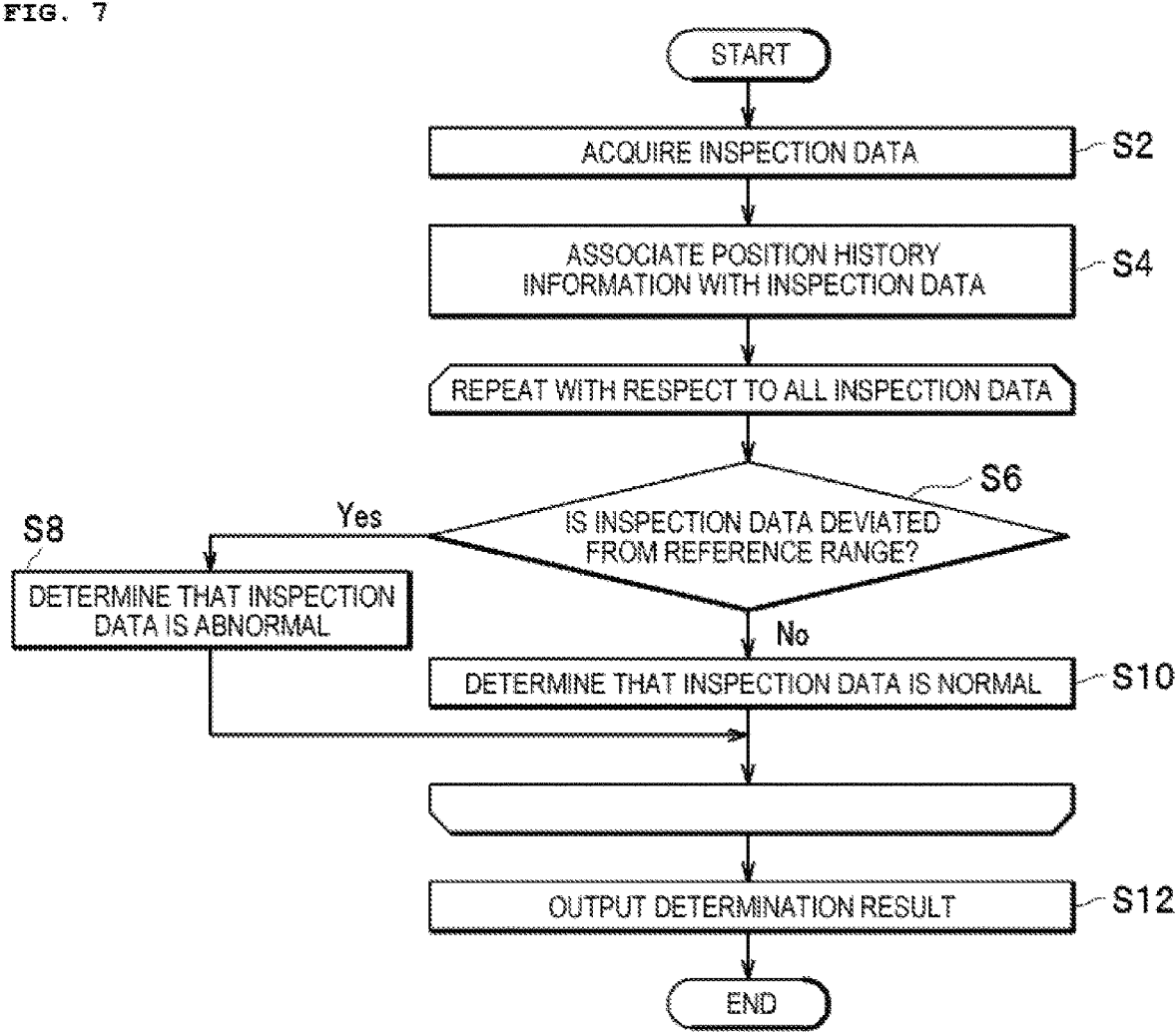
FIG. 7 is a flowchart of an inspection processing program according to the first embodiment.

FIG. 7 is a flowchart of the inspection processing program executed by the data processing part 43 of the evaluation device 4.

In FIG. 7, when the processing proceeds to step S2, the data processing part 43 acquires the inspection data from the storage part 47. Next, when the processing proceeds to step S4, the data processing part 43 associates the position history information of the measuring vehicle 200 (see FIG. 1) with the inspection data. The measuring vehicle 200 has a position measuring function, and the position on the track is sequentially recorded with time. In addition, the inspection data is stored in the storage part 47 in association with the data measurement time. Accordingly, in step S4, by such data, the inspection data is associated with the position on the track.

Next, the loop of steps S6, S8, and S10 is repeated with respect to all the inspection data acquired in step S2. First, in step S6, the data processing part 43 determines whether or not the inspection data of the processing target is deviated from a reference range, that is, a range in which the data can be estimated to be normal. Herein, when it is determined "Yes", the processing proceeds to step S8, and the data processing part 43 determines that the inspection data is abnormal.

On the other hand, when it is determined "No" in step S6, the processing proceeds to step S10, and the data processing part 43 determines that the inspection data is normal. Further, when the processing of step S6 to S10 are ended with respect to all the inspection data, the processing proceeds to step S12, the data processing part 43 causes the storage part 47 to store the determination result of the normality/abnormality of each inspection data and causes the display part 46 to display the determination result. Thus, the processing of this routine is ended.

Next, the display mode of the determination result in the above-described step S12 will be described with reference to FIGS. 8A, 8B, and 8C.

Figure 8A:
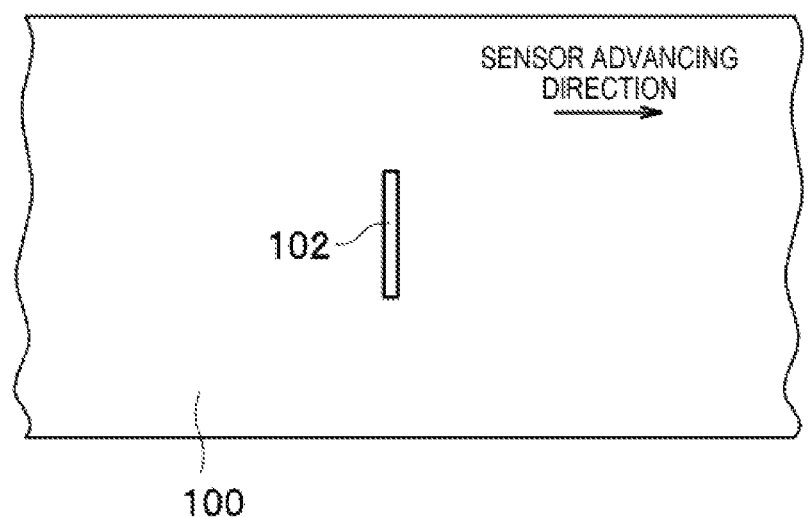
FIG. 8A is a view illustrating a specific example of a defective portion formed in the railroad rail.

FIG. 8A is a plan view illustrating a specific example of the defective portion 102 formed in the railroad rail 100. In the illustrated example, the defective portion 102 is a groove-shaped defect formed in a direction of crossing the railroad rail 100.

Figure 8B:
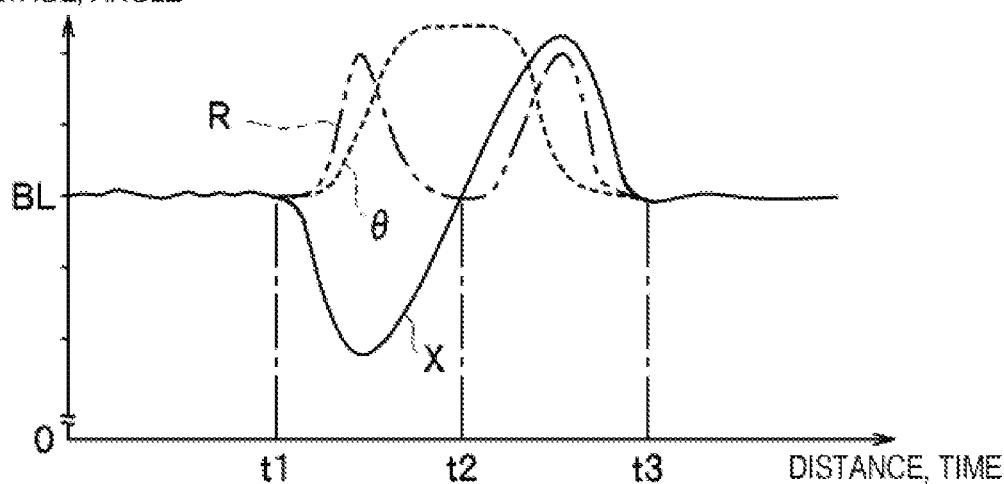
FIG. 8B is a waveform chart of each part in the vicinity of a defective portion.

FIG. 8B is an example of a waveform chart of the cosine signal X, the amplitude signal R, and the phase difference signal θ in the vicinity of the defective portion 102. Incidentally, the sine signal Y is not illustrated. However, the sine signal Y has the same shape of waveform as that of the cosine signal X (however, both amplitudes are different in general).

In FIG. 8A, the sensor part 21-k (see FIG. 3) moves at a constant speed from left to right. Then, the horizontal axis of FIG. 8B indicates the time and the position on the railroad rail 100. In addition, the vertical axis of FIG. 8B is a "voltage" for the cosine signal X and the amplitude signal R and is an "angle" for the phase difference signal θ. During the section before time t1 and after t3, the sensor part 21-k is sufficiently separated from the defective portion 102. In this case, the cosine signal X almost coincides with a predetermined offset value BL.

In the section of time t1 to t2, a negative peak appears in the cosine signal X, and in the section of time t2 to t3, a positive peak appears in the cosine signal X. In addition, the amplitude signal R has respective positive peaks in the section of time t1 to t2 and the section of time t2 to t3. In addition, the phase difference signal θ has a substantially trapezoidal waveform. FIG. 8B shows only each one system of the cosine signal X, the amplitude signal R, and the phase difference signal θ. However, actually, the signals X, Y, R, and θ are obtained in each of the sensor parts 21-1 to 21-N. As illustrated in FIG. 8B, in the cosine signal X, continuous values are obtained along the laying direction of the railroad rail 100, and N discrete values are obtained along the arrangement direction (the width direction of the railroad rail 100) of the sensor parts 21-1 to 21-N. Accordingly, the measured value of the cosine signal X can be expressed as two-dimensional data.

Figure 8C:
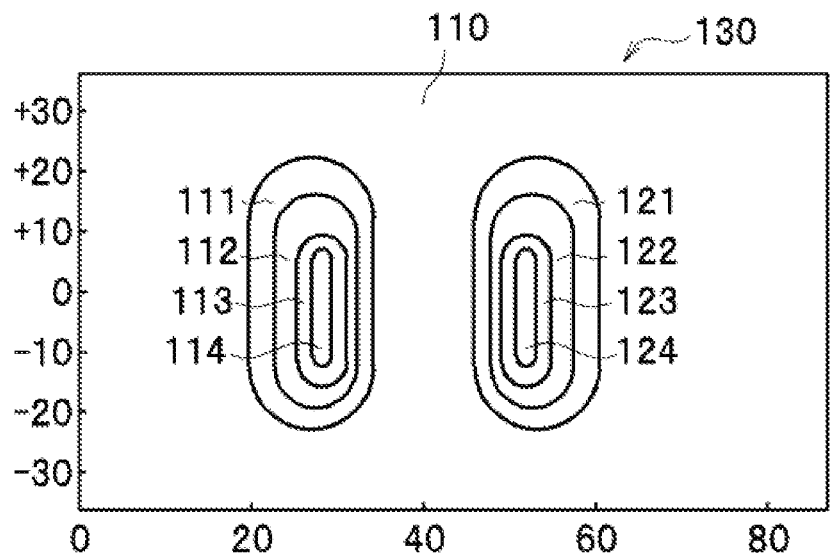
FIG. 8C is a view illustrating a display example of a two-dimensional image.

FIG. 8C is a display example of the two-dimensional image 130 on which the two-dimensional cosine signal X is displayed with contour lines in the display part 46 by the data processing part 43. In FIG. 8C, similarly to FIG. 8B, the horizontal axis corresponds to the time and the position on the railroad rail 100. In addition, the vertical axis of FIG. 8C is a position of the arrangement direction of the sensor parts 21-1 to 21-N (see FIG. 3), that is, the direction of crossing the railroad rail 100. In addition, a number such as "0", "+10", and "−10" in the vertical axis indicates a distance from the central position of the railroad rail 100 in mm units. Incidentally, the width of the tread of the railroad rail 100 is generally 65 mm.

In FIG. 8C, an area 110 is an area in which the cosine signal X is close to the offset value BL and is painted out by "green", for example. In addition, an area 114 is an area in which the cosine signal X is close to the negative peak and is painted out by "blue", for example. In addition, an area 124 is an area in which the cosine signal X is close to the positive peak and is painted out by "red", for example. Areas 111 to 113 correspond to respective ranges of a plurality of stages from the offset value BL toward the negative peak and are set to have colors which vary in a stepwise manner from green toward blue.

In addition, areas 121 to 123 correspond to respective ranges of a plurality of stages from the offset value BL toward the positive peak and are set to have colors which vary in a stepwise manner from green toward red via yellow. Accordingly, the user can visually and clearly grasp the position of the defective portion 102 in the railroad rail 100 and the depth thereof.

Incidentally, FIG. 8C shows an example in which the cosine signal X is displayed with contour lines. Instead of the cosine signal X or in addition to the cosine signal X, any one of the sine signal Y, the amplitude signal R, and the phase difference signal θ may be displayed with contour lines. In addition, in the example of FIG. 8C, the colors of red, blue, green, and the like are associated with signal intensity. However, another display mode (such as lightness and saturation) maybe associated with the signal intensity.

Herein, the description is given about the defect which is generated in the railroad rail used actually. When the wheels of the railroad vehicle roll while coming into contact with the tread of the railroad rail, fatigue accumulates in the railroad rail, and then a crack occurs in a direction parallel to the tread, that is, in the horizontal direction. Such a crack is referred to as a "horizontal crack". When fatigue further accumulates in the railroad rail in which the horizontal crack occurs, the horizontal crack may grow downward. In this way, the crack growing downward is referred to as a "lateral crack". Since the lateral crack easily spreads, if it is overlooked, the railroad rail is broken at a high probability. According to the present embodiment, the detection signal corresponding to the depth d of the defect can be output. Thus, the present embodiment is advantageous particularly in that the existence of the lateral crack and the depth thereof can be detected accurately.

Effect of First Embodiment

As described above, in the present embodiment, the detection part group (34) is provided which has a plurality of detection parts (34-1 to 34-N) which detect the first inspection signal (X) corresponding to the first phase (0°) of the output signal and the second inspection signal (Y) corresponding to the second phase (90°) of the output signal with respect to the output signal output from each of the receiver coils when the sensor part group (21) moves in the laying direction of the railroad rail (100). Thus, the defect of the railroad rail can be detected accurately.

In the present embodiment, the output processing part (44) is further provided which outputs the intensity distributions of the displaying target signals (X, Y, R, θ) corresponding to the plurality of sensor parts (21-1 to 21-N) as the two-dimensional image (130) when the first inspection signal (X) and the second inspection signal (Y) or the result (R, θ) obtained by performing the arithmetic processing on the first inspection signal (X) and the second inspection signal (Y) are used as displaying target signals. Herein, the two-dimensional image (130) is a contour image in which the display mode (such as color, brightness, and saturation) is set to correspond to the intensity of the displaying target signal (X, Y, R, θ) and is an image in which the position of the railroad rail (100) in the laying direction and the position in the width direction are used as axes. Further, the displaying target signal (X, Y, R, θ) is a signal which has the intensity corresponding to the depth of the defective portion (102) formed in the railroad rail (100), and the two-dimensional image (130) is an image in which the depth of the defective portion (102) is expressed by the display mode (such as color, brightness, and saturation). By these features, the user can more accurately recognize the defect of the railroad rail.

Second Embodiment

Configuration of Second Embodiment

Next, a second embodiment of the invention will be described. Incidentally, in the following description, in some cases, the parts corresponding to respective parts in FIGS. 1 to 8 are denoted by the same reference signs, and the description thereof is not given.

Before the configuration of the present embodiment is described, the above-described first embodiment is reviewed again. As illustrated in FIG. 4A, in a case where the railroad rail 100 has no defect such as a crack, in the magnetic fluxes φA and φB, the components interlinked in the receiver coil 6-k cancel each other, so that the interlinkage magnetic flux becomes zero ideally.

However, when there is a difference between the shapes (such as inner diameter, outer diameter, and coil length) of the oscillator coils 5A-k and 5B-k, the magnetic fluxes φA and φB generated in both is not canceled in the receiver coil 6-k, and the noise signal having the same frequency as that of the oscillation signal is output continuously from the receiver coil 6-k. Naturally, when the processing accuracy of the oscillator coils 5A-k and 5B-k is made sufficiently high, the noise signal can be reduced to a level at which there is no problem in practical use. However, since the high processing accuracy of the oscillator coils 5A-k and 5B-k drives cost to increase, it is more preferable to apply an inexpensive coil with low processing accuracy. In this regard, according to the present embodiment, the noise signal is canceled electrically so as to lower the processing accuracy required for the oscillator coils 5A-k and 5B-k.

Figure 9:
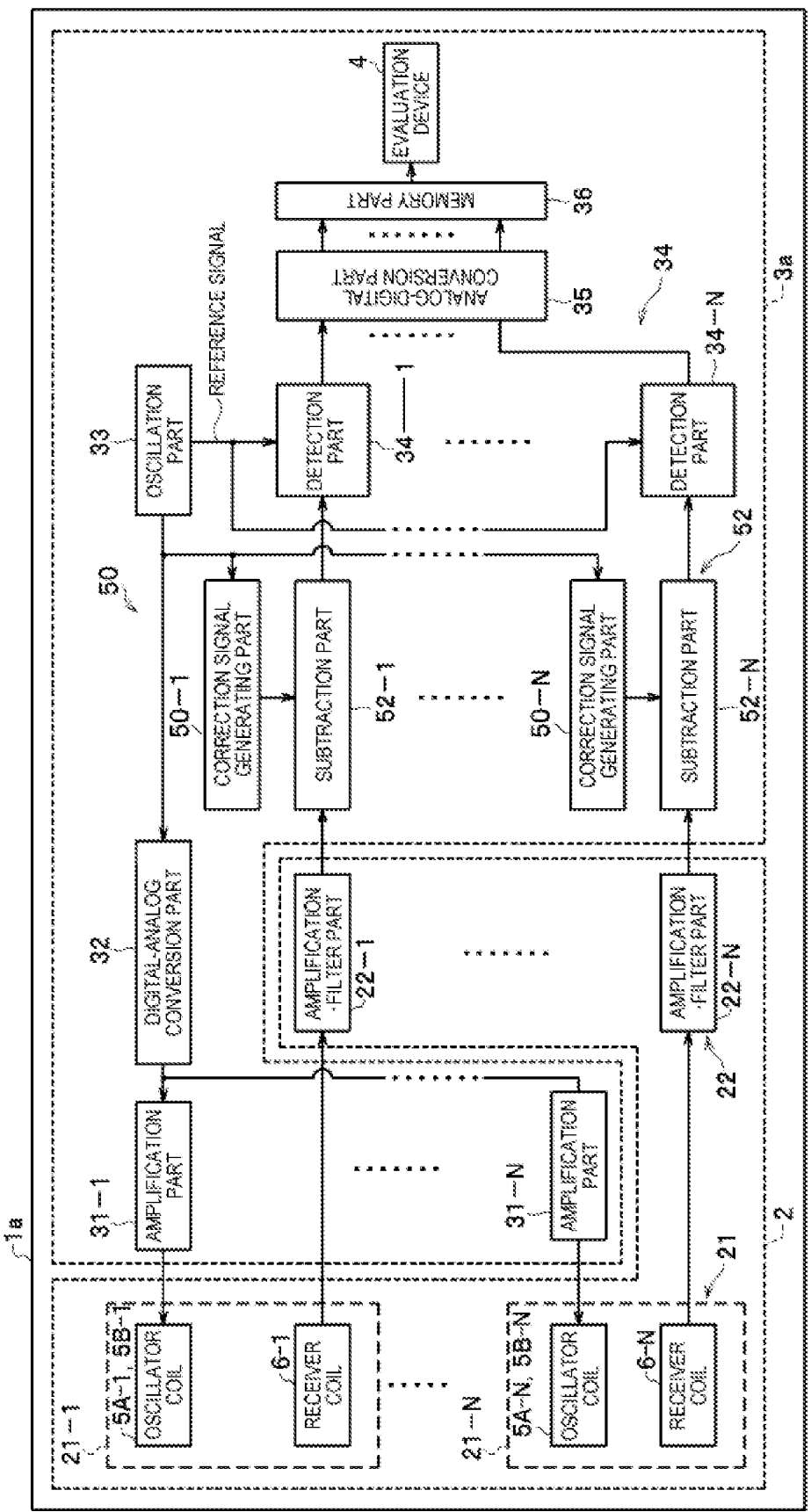
FIG. 9 is a block diagram illustrating the overall configuration of a rail inspection system according to a second embodiment.

FIG. 9 is a block diagram illustrating an overall configuration of a rail inspection system 1a according to the second embodiment of the invention. The appearance configuration of the rail inspection system 1a according to the present embodiment is similar to that of the first embodiment (see FIGS. 1 to 3). In addition, the configuration of the detector 2 is similar to that of the first embodiment (see FIG. 5). However, instead of the processor 3 (see FIG. 5) of the first embodiment, a processor 3a is applied in the present embodiment. Incidentally, in FIG. 9, the inner portion of the evaluation device 4 is not illustrated, but the configuration of the evaluation device 4 is also similar to that of FIG. 5.

In the processor 3a, correction signal generating parts 50-1 to 50-N and subtraction parts 52-1 to 52-N are provided to correspond to respective amplification filter parts 22-1 to 22-N. Incidentally, the correction signal generating parts 50-1 to 50-N are collectively referred to as a correction signal generating part group 50, and the subtraction parts 52-1 to 52-N are collectively referred to as the subtraction part group 52. As described above, the noise signal of the oscillation frequency f is superimposed with the induced voltage output by each sensor part 21-k (where 1≤k≤N), and the noise signal is amplified in the amplification filter parts 22-k. In order to cancel the noise signal, the correction signal generating part 50-k is configured to generate the correction signal having almost the same amplitude and phase as those of the noise signal.

The subtraction part 52-k cancels the noise signal by subtracting the correction signal from the output signal of the amplification filter parts 22-k. Accordingly, the signal obtained by cancelling the noise signal is supplied to the detection parts 34-1 to 34-N. The configuration of the processor 3a other than the above-described configuration is the same as that of the processor 3 (see FIG. 5) of the first embodiment.

Operation of Second Embodiment
(Main Routine)

Figure 10:
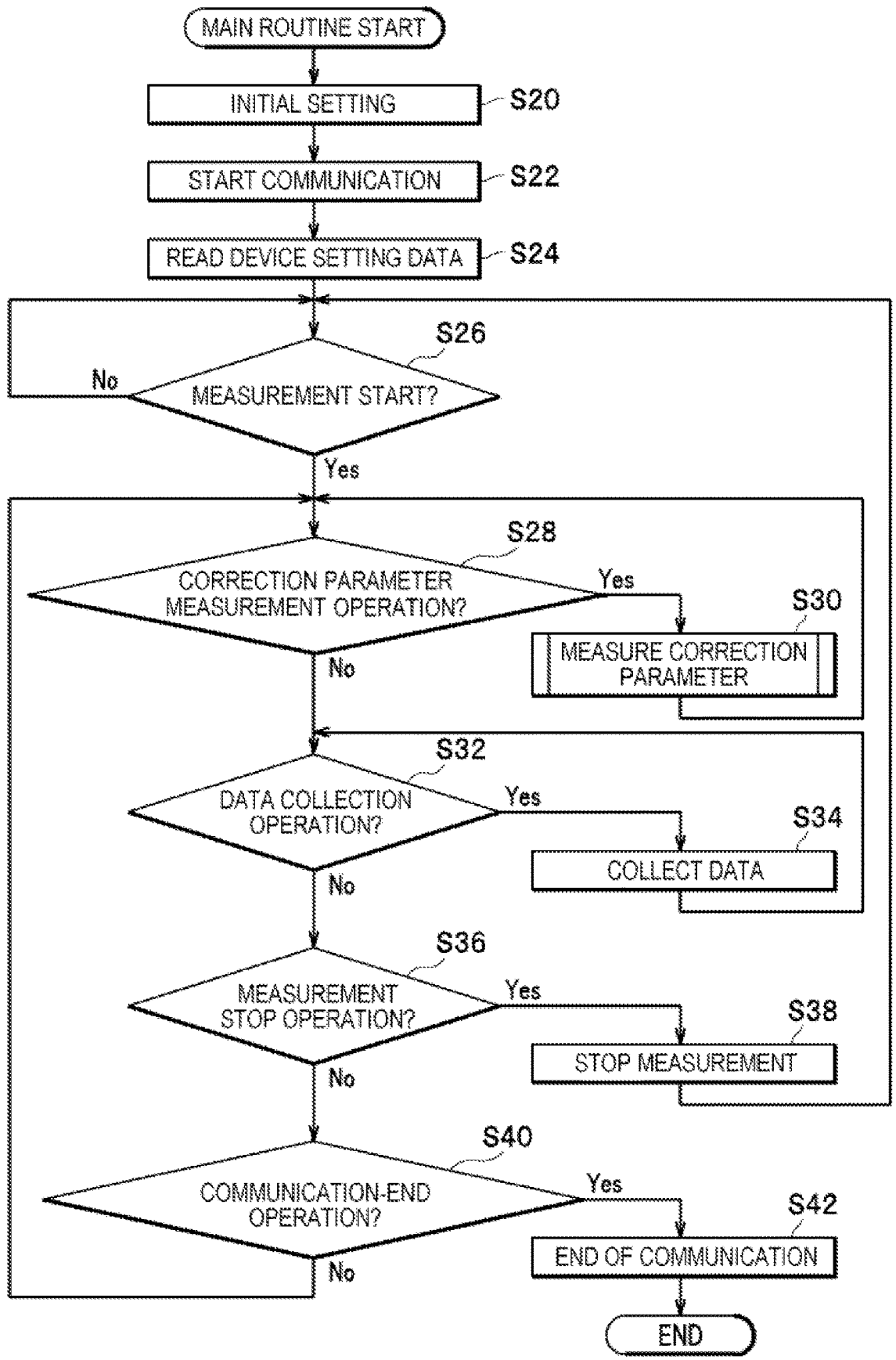
FIG. 10 is a flow chart of a main routine according to the second embodiment.

Next, the operation of the present embodiment will be described. FIG. 10 is a flow chart of a main routine executed by the evaluation device 4 (more specifically, the data processing part 43 illustrated in FIG. 5) illustrated in FIG. 9.

In FIG. 10, when the processing proceeds to step S20, the evaluation device 4 performs a predetermined initial setting. Next, when the processing proceeds to step S22, the evaluation device 4 starts communication with the memory part 36. Next, when the processing proceeds to step S24, the evaluation device 4 reads the device setting data from the storage part 47. The device setting data includes data such as the amplitude and the phase of the above-described correction signal.

Next, when the processing proceeds to step S26, the evaluation device 4 determines whether or not the measurement start instruction is input from the user through the operation input part 45 (see FIG. 5). Further, in step S26, the processing waits until the measurement start instruction is input. When the measurement start instruction is input, the processing proceeds to step S28, and it determines whether or not the user performs the correction parameter measurement operation by the operation input part 45. Incidentally, the correction parameter is a parameter for designating the amplitude and the phase of each correction signal output by the correction signal generating parts 50-1 to 50-N.

Herein, when it is determined "No", the processing proceeds to step S32, and it is determined whether or not the user performs the data collection operation by the operation input part 45. Herein, when it is determined "No", the processing proceeds to step S36, and it is determined whether or not the user performs a measurement stop operation. Herein, when it is determined "No", the processing proceeds to step S40, and it is determined whether or not the user performs a communication stop operation. Herein, when it is determined "No", the processing returns to step S28. Thereafter, these steps are repeated until it is determined "Yes" in any of steps S28, S32, S36, and S40.

In step S28, when it is determined "Yes", the processing proceeds to step S30. Herein, correction parameter measurement subroutines (FIGS. 11 to 13) to be described later are executed, the amplitude and the phase of each correction signal are determined, and then, the processing returns to step S28. In addition, when it is determined "Yes" in step S32, the processing proceeds to step S34. Herein, the evaluation device 4 executes a data collection processing. That is, the inspection data is collected through the detector 2, and the processing returns to step S32.

In addition, when it is determined "Yes" instep S36, the processing proceeds to step S38. Herein, the evaluation device 4 stops the measurement of the correction parameter or the inspection data, and the processing returns to step S26. In addition, when it is determined "Yes" in step S40, the processing proceeds to step S42. Herein, the evaluation device 4 ends the communication with the memory part 36 and also ends the processing of this routine.

(Correction Parameter Measurement Subroutine)

Figure 11:
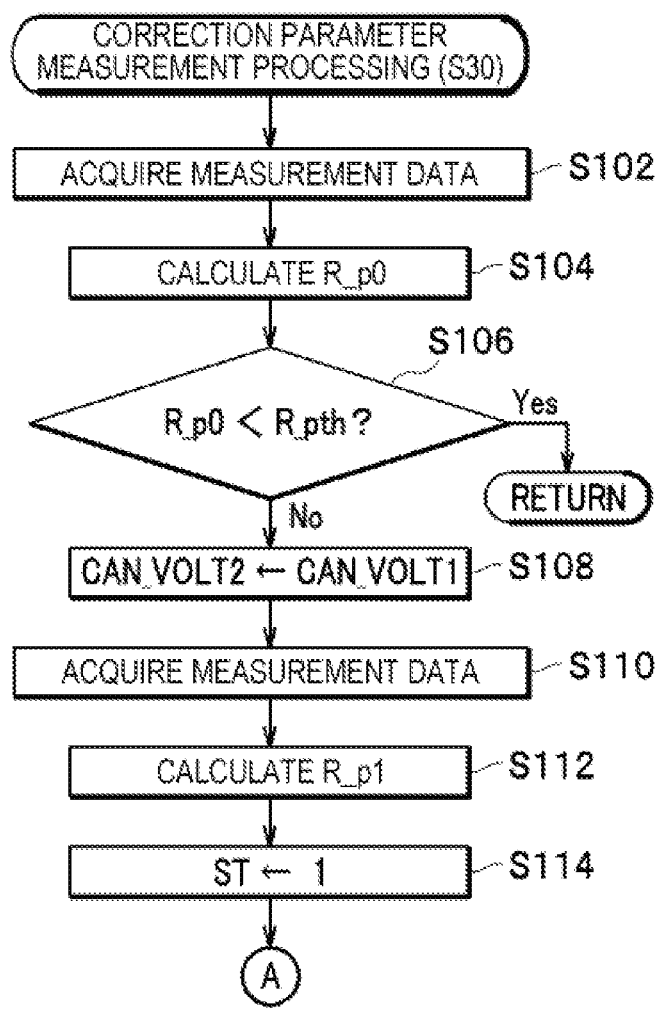
FIG. 11 is a flowchart (1/3) of a subroutine according to the second embodiment.
Figure 12:
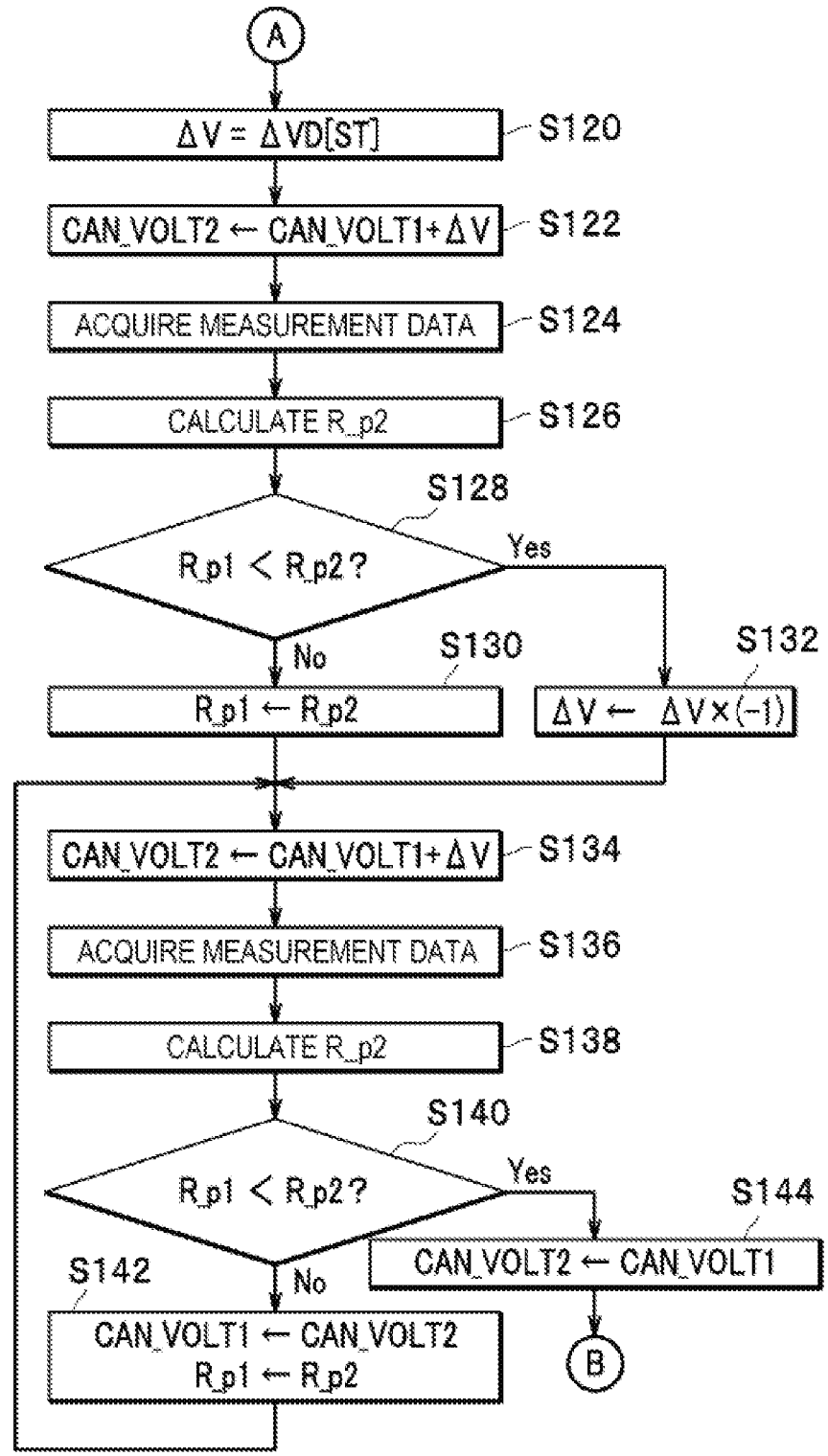
FIG. 12 is a flow chart (2/3) of the subroutine according to the second embodiment.
Figure 13:
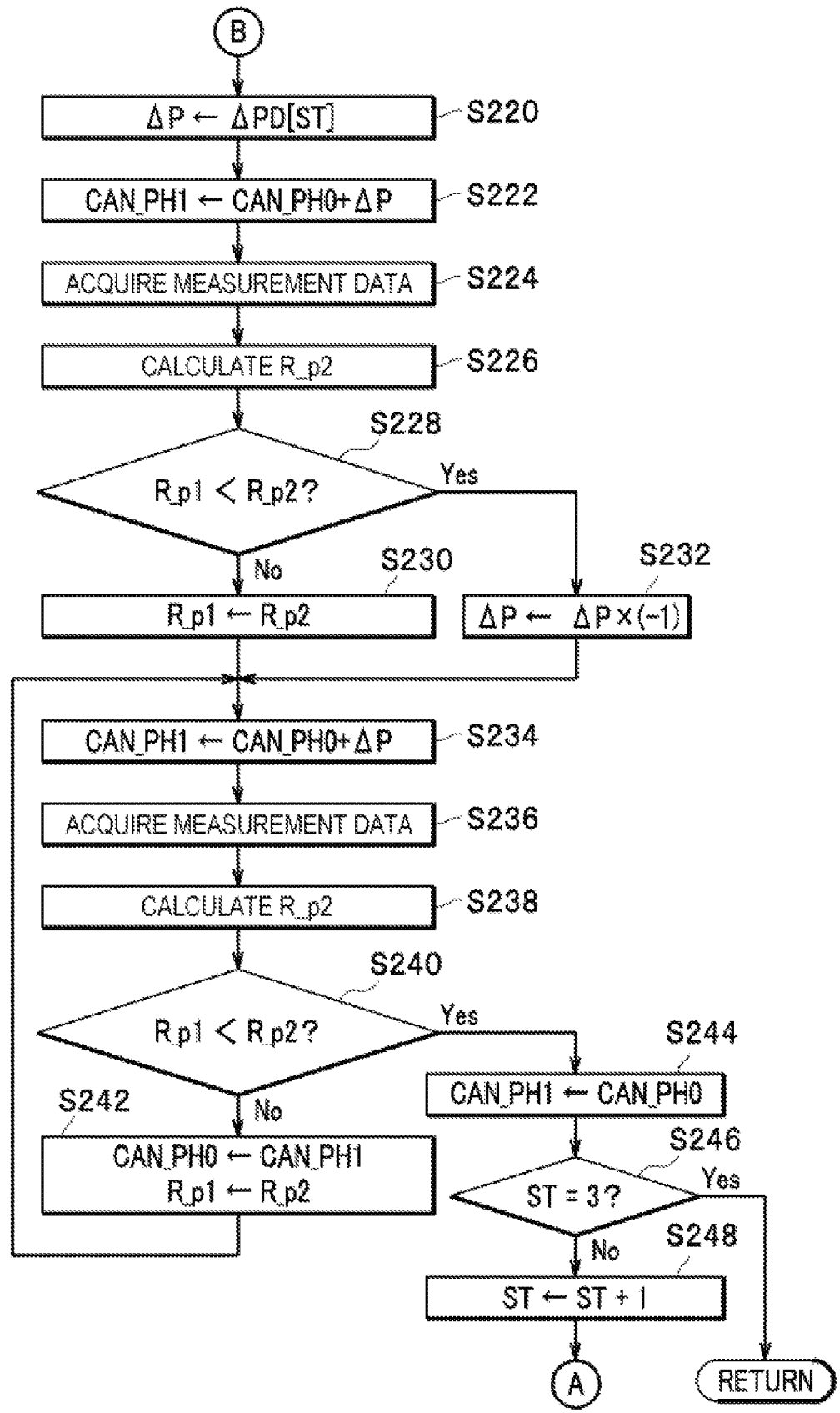
FIG. 13 is a flow chart (3/3) of the subroutine according to the second embodiment.

FIGS. 11 to 13 are flowcharts of the correction parameter measurement subroutines executed by step S30 described above.

In a case where the processing is executed, a railroad rail having no defect (close to a new one) is prepared as the railroad rail 100 illustrated in FIG. 1 and is arranged to face the detector 2. The correction parameter measurement subroutines illustrated in FIGS. 11 to 13 are sequentially executed with respect to each of the correction signal generating parts 50-1 to 50-N. Herein, FIGS. 11 to 13 illustrate the content of the processing for measuring the correction parameter corresponding to one correction signal generating part 50-k (where 1≤k≤N). That is, the processing illustrated in FIGS. 11 to 13 is repeated N times to measure the correction parameters for all the correction signal generating parts 50-1 to 50-N.

In FIG. 11, when the processing proceeds to step S102, the evaluation device 4 acquires the measurement data of a predetermined number of (a plurality of) samples. Herein, the "measurement data" is mainly data obtained by measuring the amplitude signal R. More specifically, first, the evaluation device 4 outputs the digital oscillation signal to the oscillation part 33. Next, the evaluation device 4 sets the initial value of the correction parameter with respect to the correction signal generating part 50-k which is a measurement target. Herein, the correction parameter includes an amplitude command value CAN_VOLT2 for designating the amplitude of the correction signal and a phase command value CAN_PH1 for designating the phase of the correction signal. That is, in step S102, the evaluation device 4 supplies the amplitude command value CAN_VOLT2 and the phase command value CAN_PH1 which are predetermined initial values to the correction signal generating part 50-k. Accordingly, the correction signal generating part 50-k supplies the correction signal having the set amplitude and phase to the subtraction part 52-k.

When the oscillation part 33 outputs the digital oscillation signal, through the digital-analog conversion part 32 and the amplification part 31-k, the oscillator coils 5A-k and 5B-k generate a magnetic flux, and the receiver coil 6-k generates an induced voltage. The amplification filter parts 22-k performs an amplification/filtering processing on the induced voltage and supplies the result to the subtraction part 52-k. The subtraction part 52-k subtracts the correction signal from the output signal of the amplification filter parts 22-k and supplies the result thereof to the detection part 34-k. Further, the detection part 34-k calculates the amplitude signal R on the basis of the output signal of the subtraction part 52-k. Accordingly, the measurement data of one sample of the amplitude signal R is obtained.

Herein, in order to secure the accuracy of the amplitude signal R, in step S102, the amplitude signals R of the plurality of samples (more preferably, five or more samples) are measured under the same conditions. Incidentally, instead of the detection part 34-k calculating the amplitude signal R, the evaluation device 4 may calculate the amplitude signal R on the basis of the cosine signal X and the sine signal Y measured by the detection part 34-k.

Next, in FIG. 11, when the processing proceeds to step S104, the evaluation device 4 calculates the average value of the measurement data of the amplitude signals R of the predetermined number of the acquired samples. The calculated average value is an average amplitude value R_p0. Next, when the processing proceeds to step S106, it is determined whether or not the average amplitude value R_p0 is less than a predetermined average amplitude reference value R_pth. Incidentally, the average amplitude reference value R_pth is a sufficiently low value, for example, 0.005 V. Herein when it is determined "Yes", the processing of this routine is ended. This means that the initial value of the correction parameter, that is, the initial values of the amplitude command value CAN_VOLT2 and the phase command value CAN_PH1 both are sufficiently reliable values, and the amplitude signal R becomes a sufficiently low value with respect to the railroad rail 100 having no defect. Accordingly, in such a case, the initial value as it is applied as a correction parameter, and this routine is processed.

On the other hand, when the average amplitude value R_p0 is equal to or more than the average amplitude reference value R_pth, it is determined "No" in step S106, and the processing proceeds to step S108. Herein, a value of a predetermined variable referred to as an amplitude comparison value CAN_VOLT1 is substituted for the amplitude command value CAN_VOLT2. Incidentally, at this time, the amplitude comparison value CAN_VOLT1 is set to be a predetermined value slightly larger than zero.

Next, when the processing proceeds to step S110, similarly to the above-described step S102, the measurement data of the amplitude signal R is acquired. At that time, similarly to the case of step S102, the phase of the correction signal is a predetermined initial value. However, the amplitude of the correction signal is set to be the amplitude command value CAN_VOLT2 (=amplitude comparison value CAN_VOLT1) set in previous step S108. Next, when the processing proceeds to step S112, on the basis of the measurement data of the amplitude signals R of the predetermined number of the acquired samples, the evaluation device 4 calculates an average amplitude value R_p1 thereof. Next, when the processing proceeds to step S114, 1 is substituted for a stage number ST.

Herein, the meaning of the stage number ST will be described. In the present embodiment, the amplitude signal R is measured while gradually changing the amplitude and the phase of the correction signal generated by the correction signal generating part 50-k, so as to obtain the amplitude and the phase in which the average value of the amplitude signal R becomes as small as possible. The result thereof is set to the correction parameter. Herein, a variation unit at the time of gradually varying the amplitude is referred to as an "amplitude increase/decrease value ΔV". In addition, a variation unit at the time of gradually varying the phase is referred to as a "phase increase/decrease value ΔP". Herein, the amplitude increase/decrease value ΔV and the phase increase/decrease value ΔP are not constant. The values are initially set to be a large value and gradually changed to a small value, so as to obtain accurate correction parameters as quickly as possible. The stage number ST indicates the stage of reducing the amplitude increase/decrease value ΔV and the phase increase/decrease value ΔP with natural numbers of 1 to 3.

Next, in FIG. 12, when the processing proceeds to step S120, the evaluation device 4 substitutes a voltage variation unit initial value ΔVD[ST] for the amplitude increase/decrease value ΔV. For example, the voltage variation unit initial value ΔVD[ST] is set to correspond to the stage number ST such that a voltage variation unit initial value ΔVD[1]=0.1 V, a voltage variation unit initial value ΔVD[2]=0.01 V, and a voltage variation unit initial value ΔVD[3]=0.001 V. When step S120 is executed first, the stage number ST is 1. Thus, in the above example, the amplitude increase/decrease value ΔV is set to 0.1 V.

Next, when the processing proceeds to step S122, the evaluation device 4 substitutes the result obtained by adding the amplitude comparison value CAN_VOLT1 and the amplitude increase/decrease value ΔV for the amplitude command value CAN_VOLT2. Next, when the processing proceeds to step S124, the measurement data of the amplitude signal R is acquired similarly to the above-described steps S102 and S110. Also in this case, the phase of the correction signal is a predetermined initial value. However, the amplitude of the correction signal is the amplitude command value CAN_VOLT2 obtained in step S122. Next, when the processing proceeds to step S126, on the basis of the measurement data of the amplitude signals R of the predetermined number of the acquired samples, the evaluation device 4 calculates an average amplitude value R_p2 thereof.

Next, when the processing proceeds to step S128, the evaluation device 4 determines whether or not the average amplitude value R_p1 is smaller than the average amplitude value R_p2. In the above example, the average amplitude value R_p1 is an average amplitude value obtained in a case where the CAN_VOLT1 is substituted for the amplitude command value CAN_VOLT2. In addition, the average amplitude value R_p2 is an average amplitude value obtained in a case where "CAN_VOLT1+ΔV" is substituted for the amplitude command value CAN_VOLT2. If the former is smaller than the latter, the sign (positive or negative) of the amplitude increase/decrease value ΔV has a direction of increasing the average amplitude value and is considered to be an undesirable sign. In this regard, in such a case, when it is determined "Yes" in step S128, the processing proceeds to step S132. In step S132, the evaluation device 4 inverts the sign (positive or negative) of the amplitude increase/decrease value ΔV.

On the other hand, when it is determined "No" in step S128, the processing proceeds to step S130, and the evaluation device 4 substitutes the average amplitude value R_p2 for the average amplitude value R_p1. This configuration is intended to hold the most preferable (small) value among the average amplitude values obtained previously as the average amplitude value R_p1. When the processing of step S130 or S132 is ended, the processing proceeds to step S134, and the evaluation device 4 substitutes the result obtained by adding the amplitude comparison value CAN_VOLT1 and the amplitude increase/decrease value ΔV for the amplitude command value CAN_VOLT2.

Next, when the processing proceeds to step S136, the measurement data of the amplitude signal R is acquired similarly to the above-described steps S102 and S110 or the like. Next, when the processing proceeds to step S138, on the basis of the measurement data of the amplitude signals R of the predetermined number of the acquired samples, the evaluation device 4 calculates the average amplitude value R_p2 thereof. Next, when the processing proceeds to step S140, the evaluation device 4 determines whether or not the average amplitude value R_p1 is smaller than the average amplitude value R_p2.

Herein, when it is determined "No", the processing proceeds to step S142, and the evaluation device 4 substitutes the amplitude command value CAN_VOLT2 for the amplitude comparison value CAN_VOLT1 and substitutes the average amplitude value R_p2 for the average amplitude value R_p1. Accordingly, the most preferable (small) value among the average amplitude values R_p2 obtained previously is held as the average amplitude value R_p1, and the amplitude command value CAN_VOLT2 realizing the average amplitude value R_p1 is held as the amplitude comparison value CAN_VOLT1. Further, the processing returns to step S134. Thereafter, as long as the average amplitude value R_p2 is equal to or less than the average amplitude value R_p1, the loop of steps S134 to S142 is repeated.

Herein, when the average amplitude value R_p2 obtained in step S138 is larger than the average amplitude value R_p1, it is determined "Yes" in step S140, and the processing proceeds to step S144. Herein, the amplitude comparison value CAN_VOLT1 is substituted for the amplitude command value CAN_VOLT2. At the time when step S144 is ended, when the amplitude of the correction signal is varied with a unit of a present amplitude increase/decrease value ΔV (for example, 0.1 V), the most preferable amplitude (in which the amplitude signal R becomes smaller) is substituted for the amplitude comparison value CAN_VOLT1.

Next, in FIG. 13, when the processing proceeds to step S220, the evaluation device 4 substitutes a phase variation unit initial value ΔPD[ST] for the phase increase/decrease value ΔP. For example, the phase variation unit initial value ΔPD [ST] is set to correspond to the stage number ST such that the phase variation unit initial value ΔPD[1]=10°, the phase variation unit initial value ΔPD[2]=1°, and the phase variation unit initial value ΔPD[3]=0.1°. When step S220 is executed first, the stage number ST is 1. Thus, in the above example, the phase increase/decrease value ΔP is set to 10°.

Next, when the processing proceeds to step S222, the evaluation device 4 substitutes the result obtained by adding a phase comparison value CAN_PH0 and the phase increase/decrease value ΔP for the phase command value CAN_PH1. Incidentally, at this time, the phase comparison value CAN_PH0 is the initial value of the phase among the initial values of the above-described correction parameters. Next, when the processing proceeds to step S224, the measurement data of the amplitude signal R is acquired similarly to the above-described step S102 (see FIG. 11). Next, when the processing proceeds to step S226, on the basis of the measurement data of the amplitude signals R of the predetermined number of the acquired samples, the evaluation device 4 calculates the average amplitude value R_p2 thereof.

Next, when the processing proceeds to step S228, the evaluation device 4 determines whether or not the average amplitude value R_p1 is smaller than the average amplitude value R_p2. Herein, when step S128 or S142 (see FIG. 12) is executed last, the most preferable (small) value among the average amplitude values R_p2 calculated previously is substituted for the average amplitude value R_p1. When it is determined "Yes" in step S228, the processing proceeds to step S232, and the evaluation device 4 inverts the sign (positive or negative) of the phase increase/decrease value ΔP.

On the other hand, when it is determined "No" in step S228, the processing proceeds to step S230, and the evaluation device 4 substitutes the average amplitude value R_p2 for the average amplitude value R_p1. When the processing of step S230 or S232 is ended, the processing proceeds to step S234, the evaluation device 4 substitutes the result obtained by adding the phase comparison value CAN_PH0 and the phase increase/decrease value ΔP for the phase command value CAN_PH1.

Next, when the processing proceeds to step S236, the measurement data of the amplitude signal R is acquired similarly to the above-described step S224. Next, when the processing proceeds to step S238, on the basis of the measurement data of the amplitude signals R of the predetermined number of the acquired samples, the evaluation device 4 calculates the average amplitude value R_p2 thereof. Next, when the processing proceeds to step S240, the evaluation device 4 determines whether or not the average amplitude value R_p1 is smaller than the average amplitude value R_p2.

Herein, when it is determined "No", the processing proceeds to step S242, and the evaluation device 4 substitutes the phase command value CAN_PH1 for the phase comparison value CAN_PH0 and substitutes the average amplitude value R_p2 for the average amplitude value R_p1. Accordingly, among the average amplitude values R_p2 obtained previously, the most preferable (small) value is held as the average amplitude value R_p1, and the phase command value CAN_PH1 realizing the average amplitude value R_p1 is held as the phase comparison value CAN_PH0. Further, the processing returns to step S234. Thereafter, as long as the average amplitude value R_p2 is equal to or less than the average amplitude value R_p1, the loop of steps S234 to S242 is repeated.

Herein, when the average amplitude value R_p2 obtained in step S238 is larger than the average amplitude value R_p1, it is determined "Yes" in step S240, and the processing proceeds to step S244. Herein, the phase comparison value CAN_PH0 is substituted for the phase command value CAN_PH1. At the time when step S244 is ended, when the amplitude of the correction signal is varied with a unit of a present phase increase/decrease value ΔP (for example, 10°), the most preferable phase (in which the amplitude signal R becomes smaller) is substituted for the phase command value CAN_PH1.

Next, when the processing proceeds to step S246, it is determined whether or not the stage number ST is 3. Herein, when it is determined "No", the processing proceeds to step S248, and the stage number ST is incremented by 1. For example, if the previous stage number ST is 1, 2 is substituted for the stage number ST here. Further, the processing returns to step S120 of FIG. 12.

When the stage number ST is 2, in step S120, the voltage variation unit initial value ΔVD[2], for example, 0.01 V is substituted for the amplitude increase/decrease value ΔV, and the processing of the above-described steps S122 to S144 is executed. Next, when the processing proceeds to step S220 of FIG. 13, the phase variation unit initial value ΔPD[2], for example, 1° is substituted for the phase increase/decrease value ΔP, and the processing of the above-described steps S222 to S244 is executed. Next, when the processing proceeds to step S248 through step S246, the stage number ST is incremented again, for example, to 3.

When the stage number ST becomes 3, in step S120, the voltage variation unit initial value ΔVD[3], for example, 0.001 V is substituted for the amplitude increase/decrease value ΔV, and the processing of the above-described steps S122 to S144 is executed. Next, when the processing proceeds to step S220 of FIG. 13, the phase variation unit initial value ΔPD[3], for example, 0.1° is substituted for the phase increase/decrease value ΔP, and the processing of the above-described steps S222 to S244 is executed.

With the above processing, the amplitude command value CAN_VOLT2 and the phase command value CAN_PH1 in which the amplitude signal R can be reduced sufficiently are obtained with respect to the railroad rail 100 having no defect. Next, when the processing proceeds to step S246, the stage number ST is 3, and thus it is determined "Yes". Accordingly, the processing of the correction parameter measurement subroutines (FIGS. 11 to 13) is ended, and the processing returns to step S28 of the main routine (FIG. 10).

Thereafter, when the inspection data is acquired by the data collection processing of step S34, the correction signal generating parts 50-1 to 50-N output respective correction signals on the basis of the amplitude command value CAN_VOLT2 and the phase command value CAN_PH1.

Effect of Second Embodiment

As described above, the present embodiment further includes the plurality of correction signal generating parts (50-1 to 50-N) which output the correction signals which have the same frequency as that of the oscillation signal and the amplitude and the phase different from those of the oscillation signal to the plurality of respective corresponding receiver coils (6-1 to 6-N), and the subtraction parts (52-1 to 52-N) which subtract the corresponding correction signals from the output signals of the plurality of sensor parts (21-1 to 21-N) respectively and supply respective subtraction results to the corresponding detection parts (34-1 to 34-N).

Accordingly, even in a case where the processing accuracy of the oscillator coils 5A-k and 5B-k (see FIG. 4) is low, the noise signal can be cancelled electrically, and the defect of the railroad rail 100 can be detected precisely.

Third Embodiment

Next, a third embodiment of the invention will be described. Incidentally, in the following description, in some cases, the parts corresponding to respective parts in FIGS. 1 to 13 are denoted by the same reference signs, and the description thereof is not given.

Figure 14:
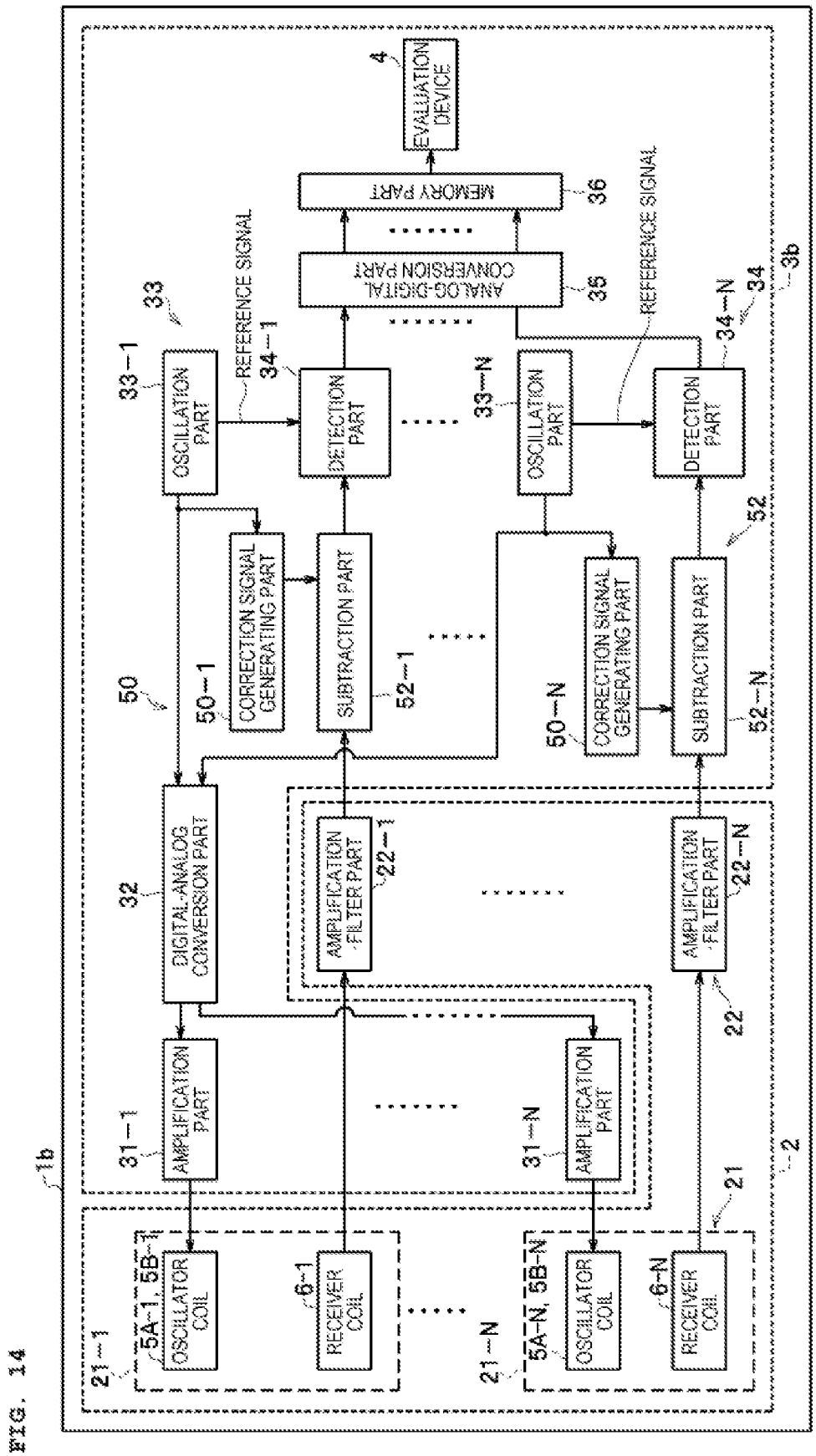
FIG. 14 is a block diagram illustrating the overall configuration of a rail inspection system according to a third embodiment.

FIG. 14 is a block diagram illustrating the overall configuration of a rail inspection system 1b according to the third embodiment of the invention. The appearance configuration of the rail inspection system 1b of the present embodiment is similar to that of the first embodiment (see FIGS. 1 to 3). In addition, the configuration of the detector 2 is similar to that of the first embodiment (see FIG. 5). However, instead of the processor 3 (see FIG. 5) of the first embodiment, a processor 3b is applied in the present embodiment. Incidentally, in FIG. 14, the inner portion of the evaluation device 4 is not illustrated, but the configuration of the evaluation device 4 is also similar to that of FIG. 5.

Similarly to the processor 3a (see FIG. 9) of the second embodiment, the processor 3b of the present embodiment is provided with the correction signal generating parts 50-1 to 50-N and the subtraction parts 52-1 to 52-N in correspondence to respective amplification filter parts 22-1 to 22-N. However, in the present embodiment, as illustrated in FIG. 14, individual oscillation part 33-1 to 33-N are provided to correspond to the amplification filter parts 22-1 to 22-N. These oscillation part 33-1 to 33-N output the digital oscillation signals and the reference signals of oscillation frequencies f1 to fN (predetermined frequency) different from each other.

The oscillation part 33-k (where 1≤k≤N) supplies the digital oscillation signal of the oscillation frequency fk to the digital-analog conversion part 32 and the correction signal generating part 50-k and supplies the reference signal of the oscillation frequency fk to the detection part 34-k. The digital-analog conversion part 32 converts the digital oscillation signals of N channels into respective analog signals and supplies the analog signals to the sensor parts 21-1 to 21-N. Accordingly, the receiver coil 6-k of the sensor part 21-k generates an induced voltage of the frequency fk, and the induced voltage is amplified and filtered by the amplification filter parts 22-k.

The correction signal generating part 50-k supplies the correction signal of the oscillation frequency fk to the subtraction part 52-k, and the subtraction part 52-k cancels the noise signal by subtracting the correction signal from the output signal of the amplification filter parts 22-k. Accordingly, the signal obtained by cancelling the noise signal is supplied to the detection parts 34-1 to 34-N. The configuration of the processor 3b other than the above-described configuration is the same as that of the processor 3 (see FIG. 5) of the first embodiment.

As illustrated in FIG. 3, in the detector 2, the plurality of sensor parts 21-1 to 21-N are arranged to configure the sensor part group 21. However, when the magnetic flux having the same frequency is generated in the oscillator coils 5A-1 to 5A-N and 5B-1 to 5B-N as in the first and second embodiments, an interference may occur to each other. With respect thereto, according to the present embodiment of FIG. 14, the different oscillation frequencies f1 to fN are applied to respective sensor parts 21-1 to 21-N. Thus, the mutual interference of the sensor parts 21-1 to 21-N can be reduced. Incidentally, in a case where the railroad rail 100 configures apart of the track circuit, all the oscillation frequencies fk (where 1≤k≤N) are preferably selected among the frequencies separated ±0.07 fk or more from the frequency used in the track circuit.

As described above, according to the present embodiment, the oscillation parts (33-1 to 33-N) output the oscillation signals having different frequencies (f1 to fN) to the plurality of sensor parts (21-1 to 21-N). Accordingly, the interference between the sensor parts (21-1 to 21-N) can be reduced.

Fourth Embodiment

Next, the fourth embodiment of the invention will be described. Incidentally, in the following description, in some cases, the parts corresponding to respective parts in FIGS. 1 to 14 are denoted by the same reference signs, and the description thereof is not given.

In the above-described first to third embodiments, when the traveling speed of the measuring vehicle 200 (see FIG. 1) increases, the rail inspection can be executed more quickly. However, when the traveling speed of the measuring vehicle 200 increases, the vibration of the measuring vehicle 200 is also increased, and the vibration affects each of the signals X, Y, R, and θ.

Figure 15:
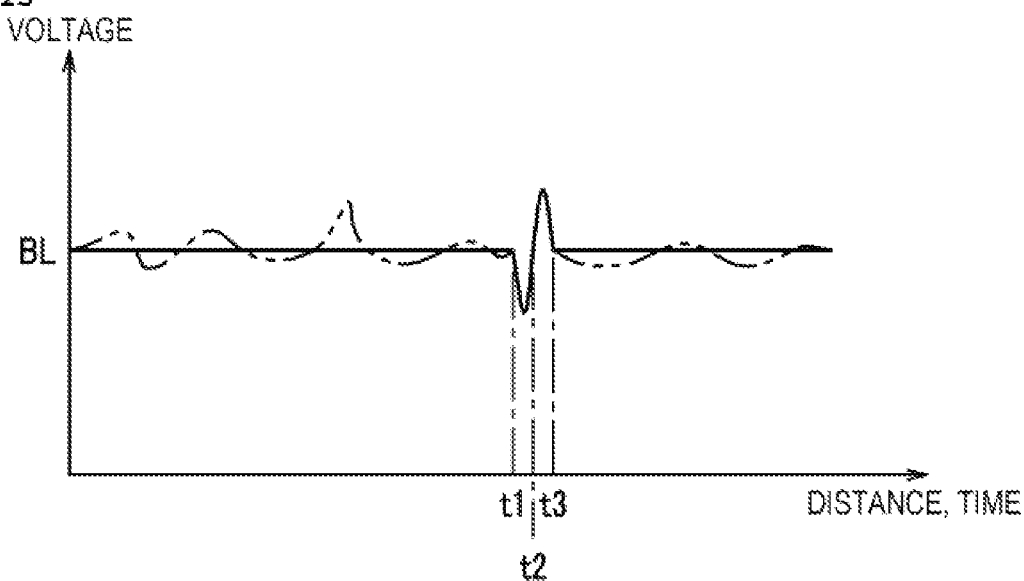
FIG. 15 is an example of a waveform chart of a cosine signal X.

Herein, the effect accompanying the acceleration of the measuring vehicle 200 will be described with reference to FIG. 15. Incidentally, FIG. 15 is an example of the waveform chart of the cosine signal X. FIG. 15 is a waveform obtained by shortening the waveform of the cosine signal X illustrated in FIG. 8B along the time axis, and time t1 to t3 illustrated in FIG. 15 corresponds to time t1 to t3 illustrated in FIG. 8B.

A solid line in FIG. 15 is an example of the waveform of the cosine signal X in a case where the speed of the measuring vehicle 200 is relatively low. In this case, in the section (before time t1 and after t3) separated from the defective portion 102 (see FIG. 8A), the level of the cosine signal X approximately coincides with the offset value BL. On the other hand, a two-dot chain line is an example of the waveform of the cosine signal X in a case where the speed of the measuring vehicle 200 is relatively high. When the speed of the measuring vehicle 200 is increased, the measuring vehicle 200 is vibrated, and the cosine signal X is varied also in the section separated from the defective portion. For this reason, the variation of the cosine signal X in time t1 to t3 when the defective portion 102 appears may be difficult to be distinguished from the variation caused by the vibration.

Hereinbefore, the description is given about the example of the cosine signal X. However, other signals Y, R, and $\theta$ are similarly varied by the vibration of the measuring vehicle 200. In the present embodiment, the effect caused by the vibration of the measuring vehicle 200 is compensated to enable the measuring vehicle 200 to be operated at a higher speed.

Herein, in the section (before time t1 and after t3) separated from the defective portion 102, the waveforms of the signals Y, R, and $\theta$ are similar to the waveform of the cosine signal X. On the other hand, as described in FIG. 8B, the waveforms of the amplitude signal R and the phase difference signal $\theta$ in the defective portion 102 (time t1 to t3) are clearly different from that of the cosine signal X. Incidentally, the waveform shape (not illustrated) of the sine signal Y is similar to that of the cosine signal X.

In this regard, for example, when a difference signal R-X is obtained which is the difference between the amplitude signal R and the cosine signal X, the difference signal R-X becomes almost 0 at the section (before time t1 and after t3) separated from the defective portion 102. On the other hand, at time t1 to t3 corresponding to the defective portion 102, as illustrated in FIG. 8B, the waveform of the cosine signal X and the waveform of the amplitude signal R are different clearly. Thus, the difference signal R-X of both signals is considered to be a signal generating a relevant amplitude. Accordingly, when it is determined on the basis of the difference signal R-X whether or not the defective portion 102 is present, the effect caused by the vibration of the measuring vehicle 200 can be reduced.

Figure 16:
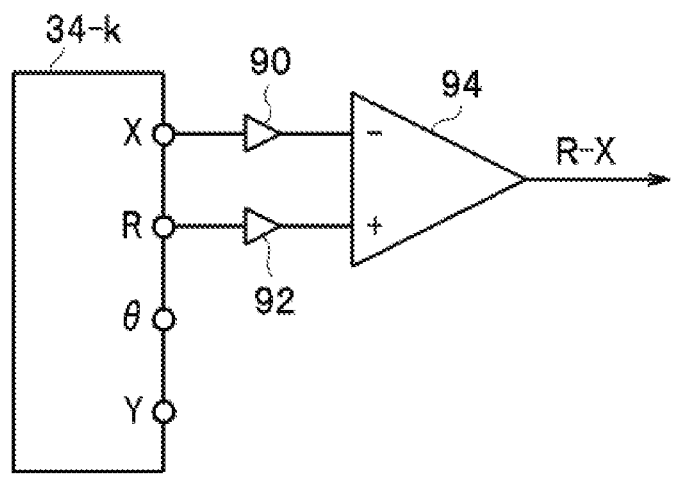
FIG. 16 is a circuit diagram of main parts of a rail inspection system according to a fourth embodiment.

Next, the configuration of the present embodiment will be described. The overall configuration of the present embodiment is similar to that (see FIG. 14) of the third embodiment. However, the configuration of the place illustrated in FIG. 16 is different. Incidentally, FIG. 16 is a circuit diagram of the main parts of the rail inspection system 1 according to the present embodiment.

In FIG. 16, the detection part 34-k (where 1≤k≤N) is similar to those (see FIG. 6) of the first to third embodiments. In the present embodiment, gain adjustment parts 90 and 92 and a differential amplifier 94 are added to the latter part of each detection part 34-k.

The gain adjustment parts 90 and 92 may set gains such that the levels of the cosine signal X and the amplitude signal R in the section having on defect become almost equal. Further, the differential amplifier 94 outputs the difference signal R-X which is the difference between the amplitude signal R and the cosine signal X of which the gains are adjusted. Further, in addition to the signals X, Y, R, and $\theta$, the analog-digital conversion part 35 converts the difference signal R-X into the digital signal and supplies the signal to the evaluation device 4 through the memory part 36. Further, the evaluation device 4 detects the defective portion 102 of the railroad rail 100 on the basis of the difference signal R-X. The configuration and the operation other than the above description of the present embodiment are similar to those of the third embodiment.

As described above, according to the present embodiment, the defective portion 102 of the railroad rail 100 is detected on the basis of the difference signal R-X. Thus, even in a case where the measuring vehicle 200 travels at high speed, the effect caused by the vibration of the measuring vehicle 200 can be reduced.

Modifications

The invention is not limited to the embodiments described above, and various modifications are possible. The above-described embodiments are exemplarily presented to comprehensively describe the invention, and thus, the invention is not necessarily limited to an invention including all the configurations described above. In addition, it is possible to replace a certain configuration in one embodiment with a configuration in another embodiment. Further, it is also possible to add a configuration in one embodiment to a configuration in another embodiment. In addition, it is possible to remove some configuration in each embodiment or to add or replace another configuration. In addition, the control lines and information lines illustrated in the drawings indicate what is considered to be necessary for explanation and do not necessarily indicate all control lines and information lines on products. In fact, almost all of the configurations maybe considered to be connected to each other. Examples of possible modifications of the above-described embodiments include the following.

(1) The hardware of the evaluation device 4 in the above-described embodiments can be realized by a general computer. Thus, the program or the like according to the flowchart illustrated in FIGS. 7 and 10 to 13 may be stored in a storage medium or distributed through a transmission path.

(2) The processing illustrated in FIGS. 7 and 10 to 13, and the like is described as a software-like processing using the program in the embodiment. However, some or all of the processing may be replaced with a hardware-like processing using an ASIC (Application Specific Integrated Circuit), a FPGA (field-programmable gate array) or the like.

(3) In the above-described embodiments, the detector 2 and the processor 3 are mounted on the measuring vehicle 200 (see FIG. 1). However, the detector and the processor may be mounted on a hand cart (not illustrated) or the like to be carried by a user.

(4) In addition, in the above-described embodiments, the detection part 34-k (where 1≤k≤N) outputs the cosine signal X, the sine signal Y, the amplitude signal R, and the phase difference signal $\theta$. However, the values obtained by time-differentiating those signals may be output with the signals X, Y, R, and $\theta$ (or instead of the signals X, Y, R, and $\theta$). In addition, the time-differentiated values may be displayed on the two-dimensional image 130 (see FIG. 8C).

Figure 17:
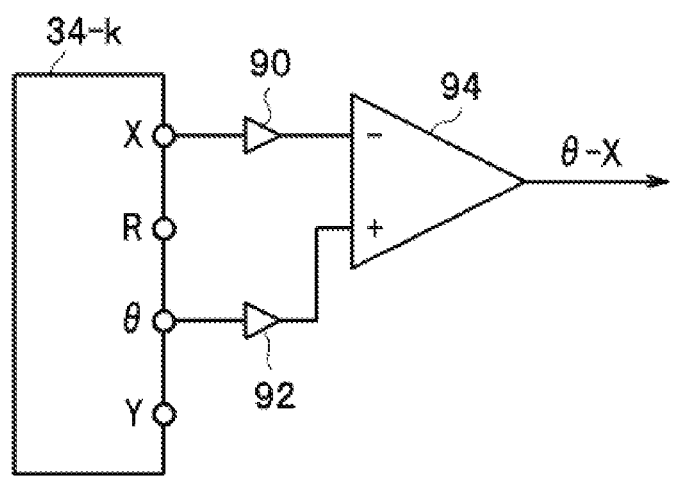
FIG. 17 is a circuit diagram of a modification of the fourth embodiment.

(5) In the fourth embodiment, the difference between the amplitude signal R and the cosine signal X is obtained. However, also in a case where the difference between "any one of the signals X and Y" and "anyone of the signals R and θ" is obtained, the effect caused by the vibration can be reduced, and the defective portion 102 can be detected similarly. For example, as illustrated in FIG. 17, the phase difference signal θ may be supplied to the gain adjustment part 92, and the difference signal θ-X which is the difference between the cosine signal X and the phase difference signal θ may be output from the differential amplifier 94.

REFERENCE SIGNS LIST 1, 1a, 1b: rail inspection system
2: detector
3, 3a, 3b: processor
4: evaluation device
5A-1 to 5A-N: oscillator coil (first oscillator coil)
5B-1 to 5B-N: oscillator coil (second oscillator coil)
6-1 to 6-N: receiver coil
21: sensor part group
21-1 to 21-N: sensor part
33, 33-1 to 33-N: oscillation part
34: detection part group
34-1 to 34-N: detection part
44: output processing part
50-1 to 50-N: correction signal generating part
52-1 to 52-N: subtraction part
100: railroad rail
102: defective portion
110 to 114, 121 to 124: area
130: two-dimensional image
R: amplitude signal (displaying target signal)
X: cosine signal (first inspection signal, displaying target signal)
Y: sine signal (second inspection signal, displaying target signal)
θ: phase difference signal (displaying target signal)
f, f1 to fN: oscillation frequency (predetermined frequency)

The invention claimed is:

1. A rail inspection system comprising:
a plurality of sensor parts, each of which includes a receiver coil, a first oscillator coil and a second oscillator coil, the sensor parts being arranged in a line parallel to a width direction of a railroad rail as an inspection target;
an oscillation part which supplies an oscillation signal to each of the first oscillator coils and the second oscillator coils; and
a plurality of detection parts, each of which corresponds to one of the plurality of sensor parts, each of the detection parts configured to detect a first inspection signal corresponding to a first phase of an output signal and a second inspection signal corresponding to a second phase of the output signal, the output signal being output from the receiver coil of the corresponding sensor parts when the plurality of sensor parts moves in a laying direction of the railroad rail.

2. The rail inspection system according to claim 1, further comprising:
an output processing part which outputs intensity distributions of displaying target signals corresponding to the plurality of sensor parts as a two-dimensional image when the first inspection signal and the second inspection signal or a result obtained by performing an arithmetic processing on the first inspection signal and the second inspection signal are set as the displaying target signal.

3. The rail inspection system according to claim 2, wherein
the two-dimensional image is a contour image in which a display mode is set to correspond to an intensity of the displaying target signal.

4. The rail inspection system according to claim 3, wherein
the two-dimensional image is an image in which a position of the railroad rail in the laying direction and a position in a width direction are used as axes.

5. The rail inspection system according to claim 4, wherein
the displaying target signal is a signal which has an intensity corresponding to a depth of a defective portion formed in the railroad rail, and
the two-dimensional image is an image in which the depth of the defective portion is indicated by the display mode.

6. The rail inspection system according to claim 1, further comprising:
a plurality of correction signal generating parts which output correction signals which have the same frequency as that of the oscillation signal and an amplitude and a phase different from those of the oscillation signal to the plurality of respective corresponding receiver coils; and
subtraction parts which subtract the corresponding correction signals from the output signals of the plurality of sensor parts and supply respective subtraction results to the corresponding detection parts.

7. The rail inspection system according to claim 1, wherein
the oscillation part outputs oscillation signals of which frequencies are different to the plurality of sensor parts.

* * * * *